United States Patent [19]

Yagasaki et al.

[11] Patent Number: 5,786,858
[45] Date of Patent: *Jul. 28, 1998

[54] METHOD OF ENCODING IMAGE SIGNAL, APPARATUS FOR ENCODING IMAGE SIGNAL, METHOD OF DECODING IMAGE SIGNAL, APPARATUS FOR DECODING IMAGE SIGNAL, AND IMAGE SIGNAL RECORDING MEDIUM

[75] Inventors: Yoichi Yagasaki; Jun Yonemitsu, both of Kanagawa; Teruhiko Suzuki, Chiba, all of Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 729,712

[22] Filed: Oct. 7, 1996

Related U.S. Application Data

[63] Continuation of Ser. No. 302,803, Oct. 13, 1994, abandoned.

[30] Foreign Application Priority Data

Jan. 19, 1993 [JP] Japan ................................ 5-007046
Jan. 25, 1993 [JP] Japan ................................ 5-010302

[51] Int. Cl.$^6$ ...................................................... H04N 7/36
[52] U.S. Cl. ........................................... 348/415; 348/409
[58] Field of Search .................................. 348/384, 390, 348/401, 402, 409, 411, 412, 413, 415, 416, 420, 699, 405; 386/68, 81, 111, 112

[56] References Cited

U.S. PATENT DOCUMENTS

| | | | |
|---|---|---|---|
| 4,882,732 | 11/1989 | Kaminaga | 358/335 |
| 4,930,024 | 5/1990 | Kanda et al. | 360/10.1 |
| 5,057,949 | 10/1991 | Suga et al. | 360/70 |
| 5,126,852 | 6/1992 | Nishino et al. | 358/310 |
| 5,136,391 | 8/1992 | Minami | 358/310 |

(List continued on next page.)

FOREIGN PATENT DOCUMENTS

| | | | |
|---|---|---|---|
| 0 396 285 A2 | 4/1990 | European Pat. Off. | H04N 5/92 |
| 0 469 842 A2 | 2/1992 | European Pat. Off. | H04N 5/782 |
| 0 482 888 A2 | 4/1992 | European Pat. Off. | H04N 5/92 |
| 0 517 141 A2 | 6/1992 | European Pat. Off. | H04N 5/92 |
| 505985 A2 | 9/1992 | European Pat. Off. | H04N 5/92 |
| 0 536 630 A2 | 4/1993 | European Pat. Off. | H04N 9/79 |
| 38 31 277 A1 | 9/1988 | Germany | H04N 5/91 |
| 63-167585 | 7/1988 | Japan | H04N 5/93 |
| 2072780 | 3/1990 | Japan . | |
| 5-22700 | 1/1993 | Japan | H04N 5/92 |
| 5-211643 | 8/1993 | Japan | H04N 5/92 |
| WO 91 02430 | 8/1989 | WIPO | H04N 7/133 |

OTHER PUBLICATIONS

"Adaptation and Improvement of CCITT Reference Model 8 Video Coding for Digital Storage Media Applications", pp. 171–185, Carsten Herpel, Dietmar Herper and Dietrich Westerkamp, 8376 Signal Processing Image Communication 2 (1990) Aug., No. 2 Amsterdam, NE.

"A CCITT Compatible Coding Algorithm for Digital Recording of Moving Images", pp. 155–169, F. Pereira, L. Contin, M. Quaglia and P. Delicati 8376 Signal Processing Image Communication 2 (1990), Aug., No. 2, Amsterdam, NE.

"Video Coding for Recording on a CD–like Magneto–Optical Disc", pp. 46–47, Carsten Herpel, Dietmar Hepperand Dietrich Westerkamp, IEEE 1990, International Conference on Consumer Electronics, Digest of Technical Papers, Jun. 6–8, 1990, Ninth in the ICCE Series.

*Primary Examiner*—Amelia Au
*Attorney, Agent, or Firm*—Limbach & Limbach L.L.P.

[57] ABSTRACT

An image signal encoding method and apparatus is provided. An input image signal is coded to produce coded picture signals. Specifically, the coded picture signals include a group-of-pictures consisting of predictive coded pictures and bi-directionally predictive coded pictures. For at least some of the predictive coded pictures of the group-of-pictures, slices are designated which consist entirely of intra-coded macroblocks. An indication of the slices designated is provided in the coded picture signals.

45 Claims, 27 Drawing Sheets

U.S. PATENT DOCUMENTS

| | | | |
|---|---|---|---|
| 5,140,437 | 8/1992 | Yonemitsu et al. | 358/342 |
| 5,231,484 | 7/1993 | Gonzales et al. | 348/405 |
| 5,247,363 | 9/1993 | Sun et al. | 358/336 |
| 5,260,783 | 11/1993 | Dixit | 348/409 |
| 5,282,049 | 1/1994 | Hatakenaka et al. | 358/335 |
| 5,305,113 | 4/1994 | Iwamura et al. | 358/312 |
| 5,371,602 | 12/1994 | Tsuboi et al. | 360/33.1 |
| 5,377,051 | 12/1994 | Lane et al. | 360/10.3 |
| 5,455,684 | 10/1995 | Fujinami et al. | 358/335 |
| 5,543,846 | 8/1996 | Yagasaki | 348/409 |

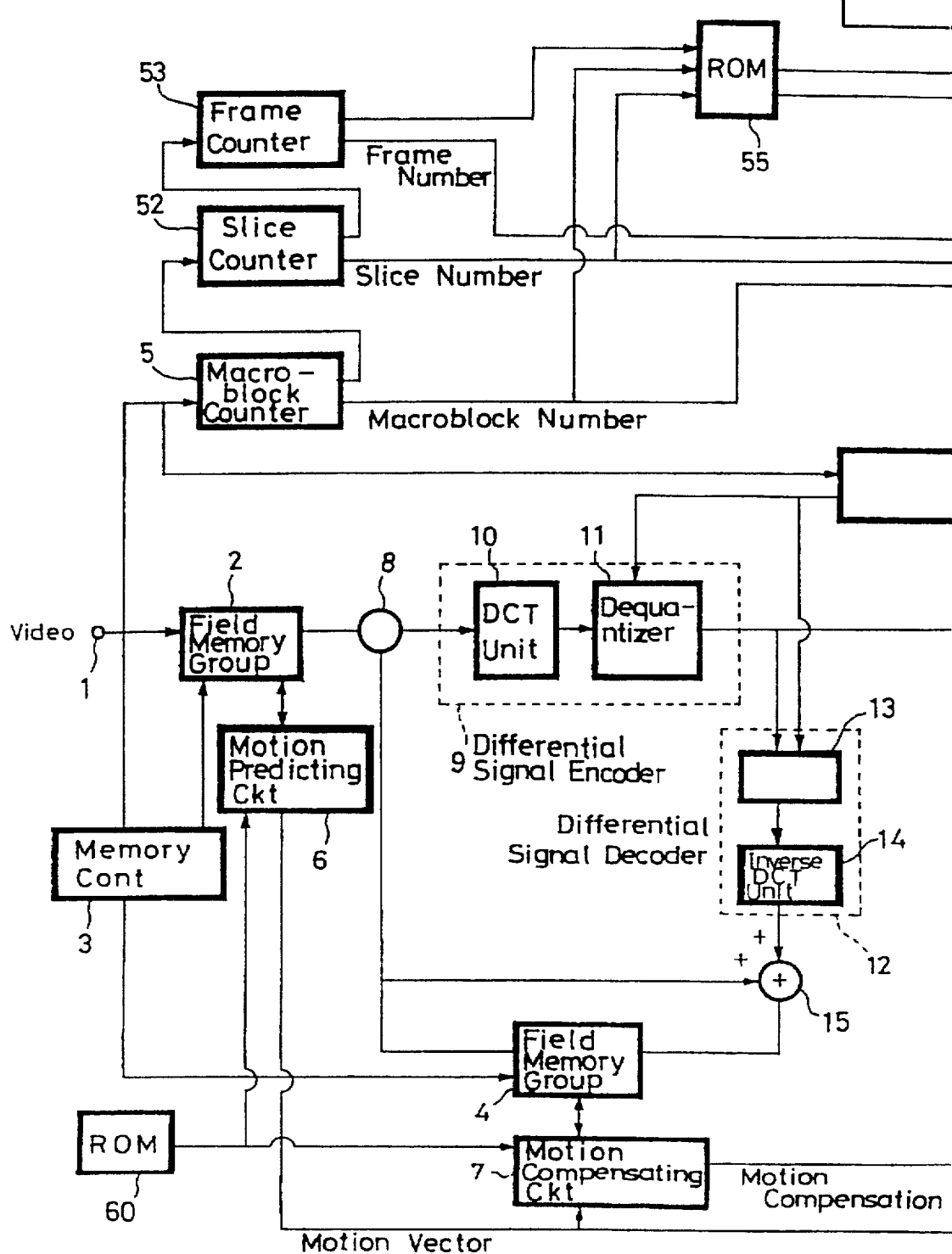

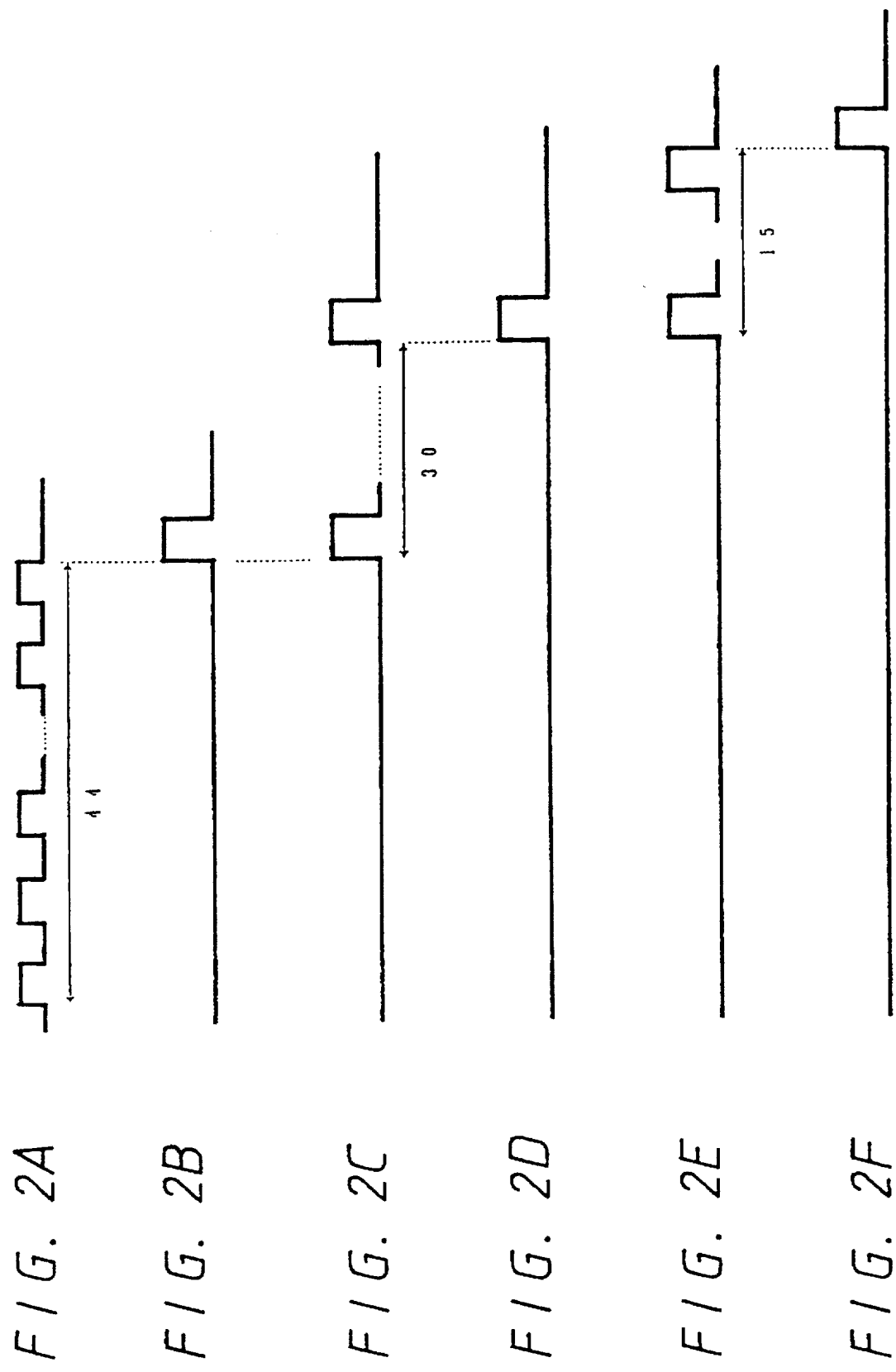

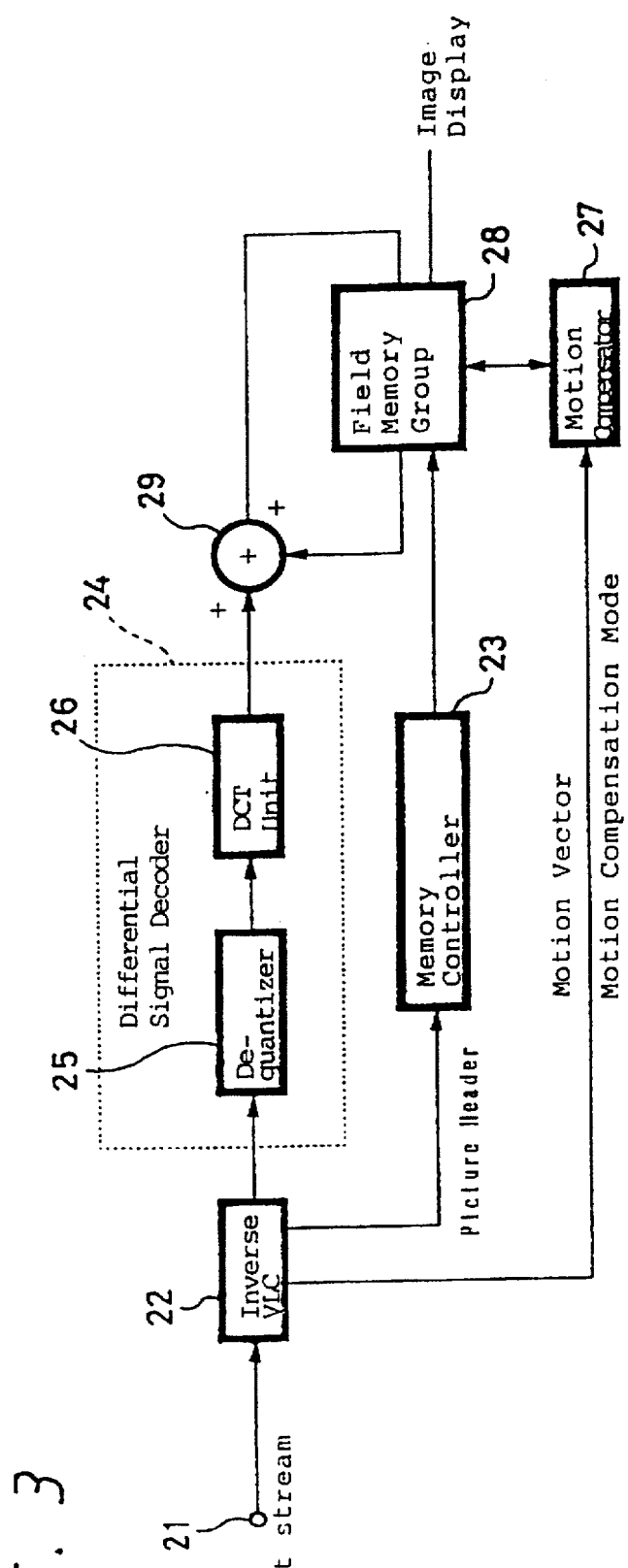

FIG. 8

```
slice() {
    slice_start_code                                    32    bslbf
    quantizer_scale                                      5    uimsbf
    if (fscalable) {
        extra_bit_slice                                  1    "1"
        dct_size                                         8    uimsbf
    }
    while(nextbits()=='1') {
        extra_bit_slice                                  1    "1"
        extra_information_slice                          8
    }
    extra_bit_slice                                      1    "0"
    do {
        macroblock()
    } while(nextbits()!='0000 0000 0000 0000 0000 0000')
    next_start_code()
}
```

FIG. 9

```
Slice(
    Slice-start-code                        32   bslbf
    quantizer-scale                          5   uimsbf
    Structure-flag                         1-2   vlc
    if(structure-flag=='10'){
        MB Number                           16   uimsbf
        Length                               4   "
        .
        .
        .
        Length N                            24   "
    }
    if(Structure-flag=='11'){                                          ⎫
        Horizontal MB Address               16   or VLC                ⎪
        Pointer                              4                         ⎪
        MB Number                           16                         ⎬ Added
        Length                               4   ·  ·  ·               ⎪
        .                                                              ⎪
        .                                                              ⎪
        .                                                              ⎪
        Length N                            24                         ⎭
    }
)
``` bslbf
uimsbf (Unsigned Integer Most Significant Bit First)
vlc

FIG. 13

Slice(
    Slice-start-code
    quantizer-scale
    structure-flag
    32        bslbf
    5         uimsbf
    1         ............ Added

FIG. 14

```
Slice(
    Slice_start_code              32  bslbf
    quantizer_scale               5   uimsbf  } Added
    structure_flag                1   VLC
    if(structure_flag == '1') {
        Total_Length
    }
)
```

FIG. 15

```
slice() {
    slice_start code                                    32      bslbf
    quantizer_scale                                     5       uimsbf
    if(fscalable){
        extra_bit_slice                                 1       ''1''
        dct_size                                        8       uimsbf
    }
    if(DSM_FF/FR){
        extra_bit_slice                                 1       ''1''
        structure_flag                                  2       uimsbf
        if(structure_flag == ''01'') {
            stuffing                                    6       ''1''
        } else if(structure_flag == ''10'') {
            MB_number                                   6       uimsbf
            for(i=0;i<MB_number;i++) {
                extra_bit_slice                         1       ''1''
                part of length[i] and stuffing          8       uimsbf
            }
        } else if(structure_flag == ''11'') {
            upper of horizontal_MB_address              6       uimsbf   ⎫
            extra_bit_slice                             1       ''1''    ⎪
            lower of horizontal_MB_address              2       uimsbf   ⎪
            upper of pointer                            6       uimsbf   ⎪
            extra_bit_slice                             1       ''1''    ⎬ Added
            middle of pointer                           8       uimsbf   ⎪
            extra_bit_slice                             1       ''1''    ⎪
            lower of pointer                            2       uimsbf   ⎪
            MB_number                                   6       uimsbf   ⎪
            for(i=0;i<MB_number;i++) {                                   ⎪
                extra_bit_slice                         1       ''1''    ⎪
                part of length[i] and stuffing          8       uimsbf   ⎭
            }
        }
    }
    while(nextbits() == '1') {
        extra_bit_slice                                 1       ''1''
        extra_information_slice                         8
    }
    extra_bit_slice                                     1       ''0''
    do {
        macroblock()
    } while(nextbits() != '000 0000 0000 0000 0000 0000')
    next_start_code()
```

F I G. 16

```
sequence_header() {
    sequence_header_code                              32      bslbf
    ...
    if(nextbits() == extension_start_code ){
        extension_start_code                          32      bslbf
        sscalable                                     1       uimsbf
        fscalable                                     1       uimsbf
  |     DSM_FF/FR                                     1       uimsbf
        chroma_format                                 2       uimsbf
    ...
}
```

FIG. 19
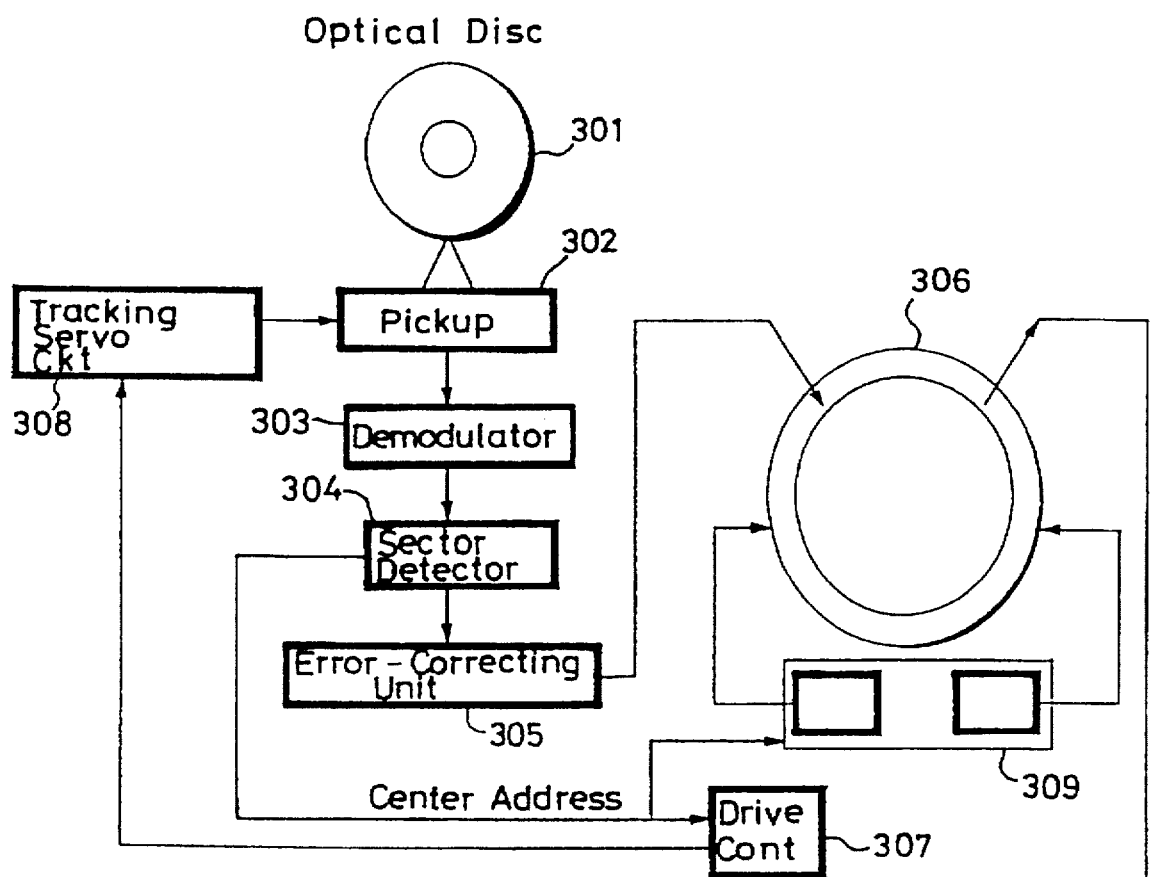
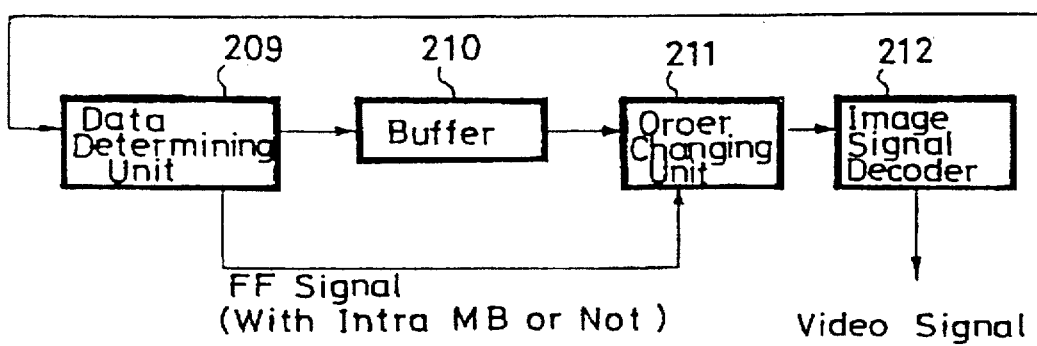

METHOD OF ENCODING IMAGE SIGNAL, APPARATUS FOR ENCODING IMAGE SIGNAL, METHOD OF DECODING IMAGE SIGNAL, APPARATUS FOR DECODING IMAGE SIGNAL, AND IMAGE SIGNAL RECORDING MEDIUM

This is a continuation of application No. 08/302,803 filed on Oct. 13, 1994, now abandoned.

TITLE OF INVENTION

Method of encoding image signal, apparatus for encoding image signal, method of decoding image signal, apparatus for decoding image signal, and image signal recording medium

1. Technical Field

The present invention relates to an encoding method, a decoding method, an encoding apparatus, a decoding apparatus, a recording medium, and a recording, reproducing, and decoding apparatus which are suitable for data compression of moving images.

2. Background Art

Since moving image data contain an extremely large amount of information, there have heretofore been required recording mediums which allow a very high continuous transmission speed in order to record and reproduce the morning image data. At present, NTSC television video signals, for example, are recorded on and reproduced from magnetic tapes and optical discs.

To record a video signal on a smaller-size recording medium having a smaller recording capacity for a longer period of time, it is necessary to employ a system that encodes the video signal highly efficiently, for reading the video signal, and that decodes the read video signal highly efficiently. To meet such a requirement, there have been proposed highly efficient encoding systems which rely upon the correlation of video signals. One such proposed system is an MPEG (Moving Picture Experts Group) system.

According to the MPEG system, the difference between image frames of a video signal is produced to reduce the redundancy in the time-axis direction, and thereafter the video signal is processed by an orthogonal transform process such as a discrete cosine transform (DCT) process to reduce the redundancy in the spatial-axis directions. The video signal is thus encoded highly efficiently before being recorded on a given recording medium.

The highly efficiently encoded video signal can be played back by decoding a reproduced signal efficiently according to inverse orthogonal transform or the like to reproduce the video signal.

High-speed playback from a recording medium on which a highly efficiently encoded video signal is recorded can be effected by decoding the video signal at intervals of several frames and outputting the decoded signal at the same speed as the speed of normal reproduction.

To encode a video signal according to the MPEG system, one video sequence is divided into a frame group (GOP), e.g., a unit of 12 frames. Each of the frames is classified as one of three types according to a predictive process.

I: Intra-coded frame (I picture);

P: Frame with motion predicted from a past frame (P picture); and

B: Frame with motion predicted from past and future frames (B picture).

A conventional GOP arrangement is shown in FIG. 26 of the Accompanying drawings. The indicated sequential number of each frame in the GOP is defined as a frame number. If the GOP is composed of 12 frames, then the first frame has a frame number 0 and the twelfth frame has a frame number 11. FIG. 26 shows an example which contains at least one frame of an I picture in one GOP. In FIG. 26, frame I2 represents an I picture and, as such, is intra-coded in its entirety.

According to the conventional MPEG system, a video signal is encoded while predicting motion between frames. Since some frames (P and B pictures) cannot be decoded in the absence of decoded images of past and/or future frames, it may not be possible to select a frame freely and reproduce it at a high speed.

Actually, the only type of frame that can be directly accessed and decoded is an intra-coded frame (I picture), which typically may be only one of about every ten frames. When only these intra-coded frames are reproduced, they can be reproduced at high speed but only with rough motion.

If all frames were decoded at a speed several times higher in order to solve the above problem, then it would be possible to reproduce them at a high speed. However, hardware limitations make it almost impossible to increase the decoding speed of all frames to be several times higher.

In addition, the reproduction of only intra-coded frames is almost impossible to carry out because too much time is required to read the data and to make track jumps.

The present invention has been made in view of the above problems, and provides a moving image decoding apparatus capable of reproducing a moving image smoothly at a high speed, in both forward and reverse directions, without increasing the decoding speed.

SUMMARY

An image signal encoding method and apparatus is provided. Input image signals are coded to produce coded picture signals. Specifically, the coded picture signals include a group-of-pictures consisting of predictive coded pictures and bi-directionally predictive coded pictures. For at least some of the predictive coded pictures of the group-of-pictures, slices are designated which consist entirely of intra-coded macroblocks. An indication of the slices designated is provided in the coded picture signals.

BRIEF DESCRIPTION OF THE DRAWINGS

FIG. 2A is a diagram showing an MB start code illustrative of operation of the FIG. 1 image encoding apparatus;

FIG. 2B is a diagram showing an MB counter reset illustrative of operation of the FIG. 1 image encoding apparatus;

FIG. 2C is a diagram showing a Slice start code illustrative of operation of the FIG. 1 image encoding apparatus;

FIG. 2D is a diagram showing a slide counter reset illustrative of operation of the FIG. 1 image encoding apparatus;

FIG. 2E is a diagram showing a frame start illustrative of operation of the FIG. 1 image encoding apparatus;

FIG. 2F is a diagram showing a frame reset illustrative of operation of the FIG. 1 image encoding apparatus;

FIG. 3 is a block diagram of an image decoding apparatus according to an embodiment of the present invention;

FIG. 8 is a diagram showing the syntax of a slice layer of MPEG;

FIG. 9 is a diagram showing an introduction of syntax according to the present invention into MPEG;

FIG. 13 is a diagram showing an introduction. of syntax according to the present invention into MPEG;

FIG. 14 is a diagram showing an introduction of syntax according to the present invention into MPEG;

FIG. 15 is a diagram showing an introduction of syntax according to the present invention into MPEG;

FIG. 16 is a diagram showing an introduction of syntax according to the present invention into MPEG;

FIG. 19 is a block diagram of a decoding system according to an embodiment of the present invention;

DETAILED DESCRIPTION

Embodiments of an encoding method, a decoding method, an encoding apparatus, a decoding apparatus, a recording medium according to the present invention will hereinafter be described with reference to the drawings.

Encoder and decoder

Highly efficient encoding and decoding methods for an image signal will first be described with reference to FIGS. 1 and 2. The encoding and decoding methods are hybrid processed which employ a combination of a motion compensation predictive encoding process and an encoding process such as of DCT (Discrete Cosine Transform).

The hybrid encoding process is widely used in standards for encoding moving images for use in storage mediums. For example, H.261 and ISOIEC/JTCI/SC2/WG11 (generally referred to as MPEG) in CCITT (International Telegraph and Telephone Consultative Committee) which are moving image encoding standards for videophone both use a hybrid encoding process.

The motion compensation predictive encoding process is a process which utilizes the correlation of a moving image signal in the time-axis direction. Specifically, an image to be encoded at present is predicted from an image signal that has already been decoded and reproduced. Rather than transmitting the image itself, motion information (including a predicted error, a motion vector, and a predictive mode) is instead transmitted. This lowers the amount of information which is required to be transmitted to represent the image.

A motion compensation predictive error signal is encoded utilizing the correlation in the amplitude-axis direction. One typical differential signal encoder is based on a combination of DCT and quantization. DCT encoding employs the two-dimensional correlation of an image signal in a frame (in a field) to concentrate signal power on a certain frequency component. Only the concentrated coefficients are encoded, hereby lowering the amount of data used to represent the picture.

Figure 1B:
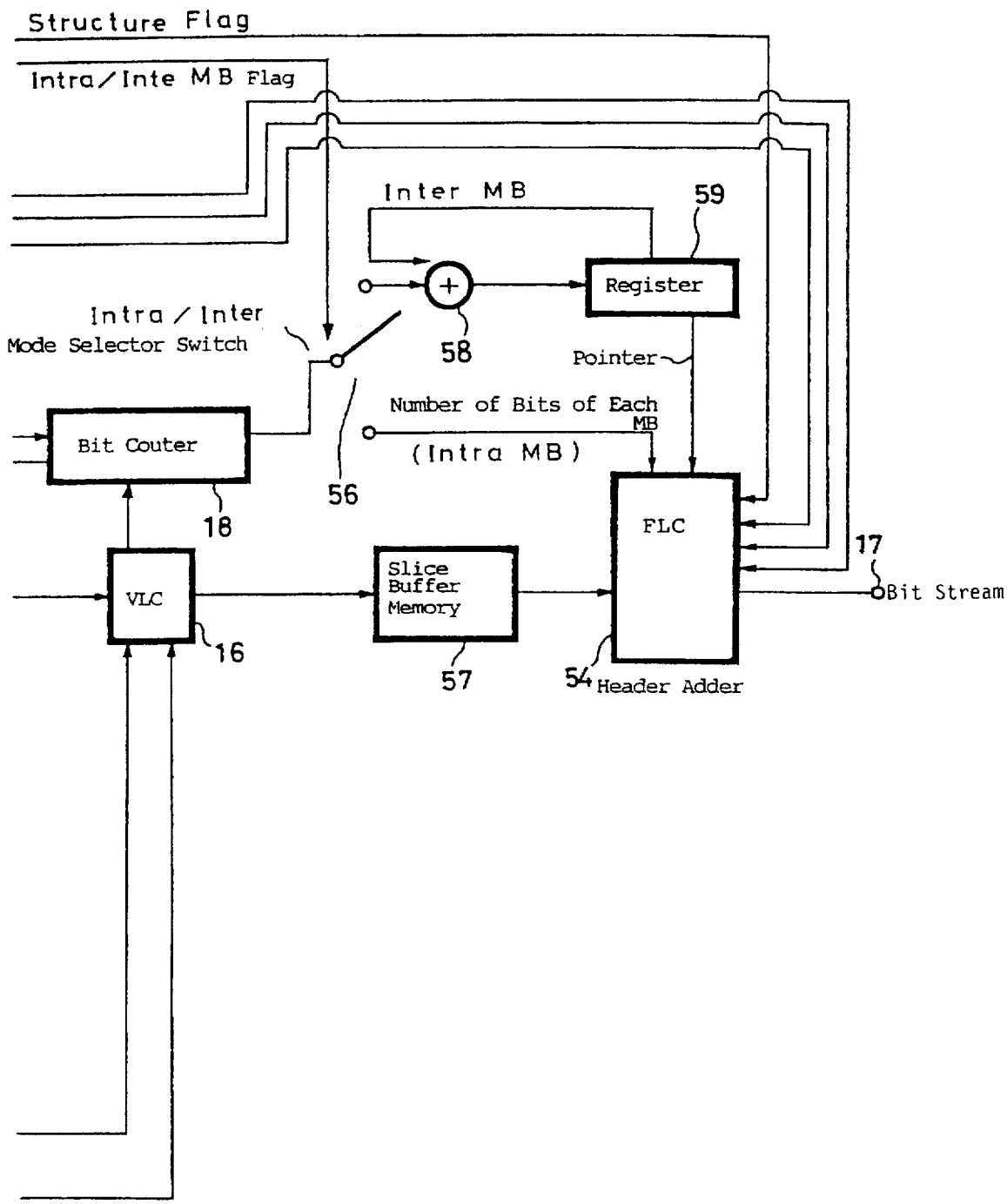
FIG. 1 (1A and 1B) is a block diagram of an image encoding apparatus for an image signal according to an embodiment of the present invention.

FIG. 1 shows a hybrid encoder 102 in block form. An image signal inputted from an image input terminal 1 is supplied to a field memory group 2. A memory controller 3 controls the readout from the field memory group 2 and a field memory group 4 according to a predetermined video sequence.

The memory controller 3 supplies a slice start code to a macroblock counter 5 in synchronism with each start of a macroblock of an image which is to be encoded at present and is read from the field memory group 2.

A motion predicting circuit 6 predicts motion of pixels in an image to be encoded at present of the image signal supplied to the field memory group 2, by referring to past and future images. The motion predicting circuit 6 block matches a block image signal in the image which is to be presently encoded and a past image or a future image. The size of a block is 16 by 16 pixels, for example. The past and future images to which the block image signal is matched is indicated from the data in the field memory group 2 according to a motion predictive reference image indicating signal outputted from the memory controller 3. The motion predicting circuit 6 determines a block position in the past and/or future image at which the predictive error of the block matching is minimized. This block position is supplied as a motion vector to a motion compensating circuit 7.

A ROM 60 stores a distribution pattern of intraframe coding macroblocks for high-speed reproduction which are assigned to each frame. The motion predicting circuit 6 limits a search range for block matching according to the distribution pattern stored in the ROM 60, for thereby limiting a range for a motion vector to be detected to limit a motion compensation range.

The motion compensating circuit 7 instructs the field memory group 4, which holds images that have already been decoded and reproduced, to output a block image signal whose position is indicated by the motion vector. The particular image is indicated from the data stored in the field memory group 2 according to the motion predictive reference image indicating signal outputted from the memory controller 3. The block image signal outputted from the field memory group 4 allows an adaptive operation, and can switch to an optimum one of four operations, indicated below, with respect to each block.

Motion compensation mode from a past reproduced image.

Motion compensation mode from a future reproduced image.

Motion compensation mode from both past and future reproduced images fa block referred to from a past reproduced image and a block referred to from a future reproduced image are subjected to a linear arithmetic operation (e.g., an average calculation) for each pixel.

No motion compensation (i.e., a within-image-coding (intra-coding) mode. In this case, the output of a block image signal is equal to zero.).

The modes are switched such that there is selected a mode in which the sum of the absolute values of the differences per pixel between the block image signals outputted in the respective four modes, described above, and the block image signal to be encoded at present. An indication of the selected mode is outputted as a motion compensation mode signal to a VLC 16, described later on.

The motion compensating circuit 7 is supplied with the distribution pattern of infra-frame coding macroblocks for high-speed reproduction from the ROM 60. The motion compensating circuit 7 selects the intra-frame coding mode as a motion compensation mode with respect to a macroblock in the distribution pattern, for which intra-coding has been indicated, irrespective of which one of the above modes has been determined.

Both the block image signal which is to be encoded at present is supplied from the field memory group 2 and the motion-compensated block image signal supplied from the field memory group 4 are supplied to a subtractor 8, which calculates the difference therebetween, per pixel, to produce a block differential signal. The block differential signal is supplied to a differential signal encoder 9, which produces an encoded signal. The encoded signal is supplied to a differential signal decoder 12 which decodes the encoded signal into a block reproduction differential signal.

The differential signal encoder 10 includes a DCT (discrete cosine transform) unit 10 and a quantizer 11 for quantizing output coefficients from the DCT unit 10. The differential signal decoder 12 includes a dequantizer 11 for dequantizing the quantized coefficients with a quantization table and an inverse DCT unit 14 for subjecting the output coefficients from the dequantizer 11 to inverse DCT.

The block reproduction differential signal is added to the block image signal outputted from the field memory group 4, in pixel-wise fashion, by an adder 15 to produce a block reproduction signal. The block reproduction signal is then stored in a field memory in the field memory group 4 which is indicated by the memory controller 3.

The encoded signal outputted from the differential signal encoder 9, together with the motion vector, the motion compensation mode, and the quantization table, is converted into a variable-length code such as the Huffman code by the VLC (variable-length coder) 16, and stored in a slice buffer memory 57. Thereafter, a header is added to the variable-length code by an FLC (fixed-length coder) 54, described later, and the code is transmitted as a bit stream through a buffer memory (not shown) from an output terminal 17 at a constant transmission rate.

As shown in FIG. 2A, a macroblock counter 51 counts macroblock start codes outputted from the memory controller 3 in synchronism the memory controller 3 causing images to be provided from the field memory group 2. For example, if one slice is composed of 44 macroblocks, then the macroblock counter 51 counts 44 macroblock start codes; thereafter, the macroblock counter is reset; and one slice is added to the slice counter 52 (FIG. 2B). If one frame is composed of 30 slices, for example (FIG. 2C), then the slice counter 52 is reset when the count thereof reaches 30, and adds one frame to a frame counter 53 (FIG. 2D). If one GOP is composed of 15 frames, for example, then the frame counter 53 is reset when the count thereof reaches 15 (FIG. 2F).

The macroblock counter 51, the slice counter 52, and the frame counter 53 provide their respective counts to the FLC (header adder) 54 and a ROM 55.

The ROM 55 holds a distribution pattern of intraframe coding macroblocks for high-speed reproduction which are assigned to each of the frames of the GOP. When supplied with the counts from the macroblock counter 51, the slice counter 52, and the frame counter 53, the ROM 55 outputs, to a macroblock mode selector switch 56, a flag which indicates whether a structure flag of the slice and the macroblock are an intra-frame coding macroblock for high-speed reproduction.

The output from the VLC 16 is stored into a slice buffer 57 so that the number of generated bits, and a pointer to the intra-frame coding macroblock, can be added to the header information.

A bit counter 18 counts the generated bits of each macroblock from the VLC 16, and the output from the bit counter 18 is supplied to one of two destinations as selected by the macroblock mode selector switch 56. First, if the macroblock is an intra macroblock, then the switch 56 is set such that the count of the generated bits of each macroblock is outputted to the FLC 54. Otherwise, if the macroblock is of a type other than an intra macroblock, then the generated bits are accumulated into a register 59 via an adder 58.

Since the sum of generated bits of macroblocks until the structural file serves as a pointer, the sum value of the sum is also outputted to the FLC 54. The register 59 is reset by a slice start code.

In response to the structure flag, the pointer, the number of generated bits of each intra macroblock, and the output from the macroblock counter, the FLC 54 adds information to a slice header according to a syntax described later.

The basic coding process in the present invention is the same as the encoding process in MPEG. However, in accordance with the disclosed embodiment of the present invention, the bit counter 18 counts generated bits of an intra macroblock, and the macroblock counter 51, the slice counter 52, and the frame counter 53 count macroblocks, slices, and frames, respectively. The count information from these counters is fed back to the FLC 54, which outputs a flag into a bit stream based on the count information.

A moving image decoding apparatus according to the present embodiment is now described with reference to FIG. 3. A bit stream signal inputted from an input terminal 21 through a transmission medium such as an optical disk or the like is supplied to an inverse VLC 22, which decodes the header information of each layer and stores control information for decoding an obtained image in a memory controller 23.

An encoded block signal 50 produced from the inverse VLC 22 is supplied to a differential signal decoder 24, which decodes the encoded block signal into a block reproduction differential signal. The differential signal decoder 24 comprises a dequantizer 25 for dequantizing quantized coefficients with a quantization table produced from the inverse VLC 22 and an inverse DCT (discrete cosine transform) unit 26 for subjecting the output coefficients from the dequantizer 25 to inverse DCT.

A motion vector and a motion compensation mode from the inverse VLC 22 are inputted to a motion compensator 27. In response to the motion vector and the motion compensation mode, the motion compensator 27 instructs a field memory group 28, in which is already stored decoded and reproduced images, to output a block image signal.

The block image signal outputted from the field memory group 28 allows an adaptive operation depending on the motion compensation mode, and can switch to an optimum one of four operations, indicated below, with respect to each block output.

The size of a block is 16 by 16 pixels, for example.

Motion compensation mode from a past reproduced image.

Motion compensation mode from a future reproduced image.

Motion compensation mode from both past and future reproduced images. A block referred to from a past reproduced image and a block referred to from a future reproduced image are subjected to a linear arithmetic operation (e.g., an average calculation) for each pixel.

No motion compensation (i.e., a within-image-coding, or intra-coding) mode. In this case, the output of a block image signal is equal to zero.

The block reproduction differential signal is added to the block image signal outputted from the field memory group 28 per pixel by an adder 29, which produces a block reproduction signal. The block reproduction signal is then stored in a field memory in the field memory group 28 in response to an indication from the memory controller 23. A reproduced image stored in the field memory 28 is indicated by an output image indicating signal from the memory controller 23 and outputted from a terminal.

The image decoding apparatus thus arranged reproduces an image from a bit stream.

Details of an encoding process is described below. In this description, a frame is as an image unit. However, where an interlaced image is encoded, it should be understood that a field may be employed as an image unit.

Figure 4:
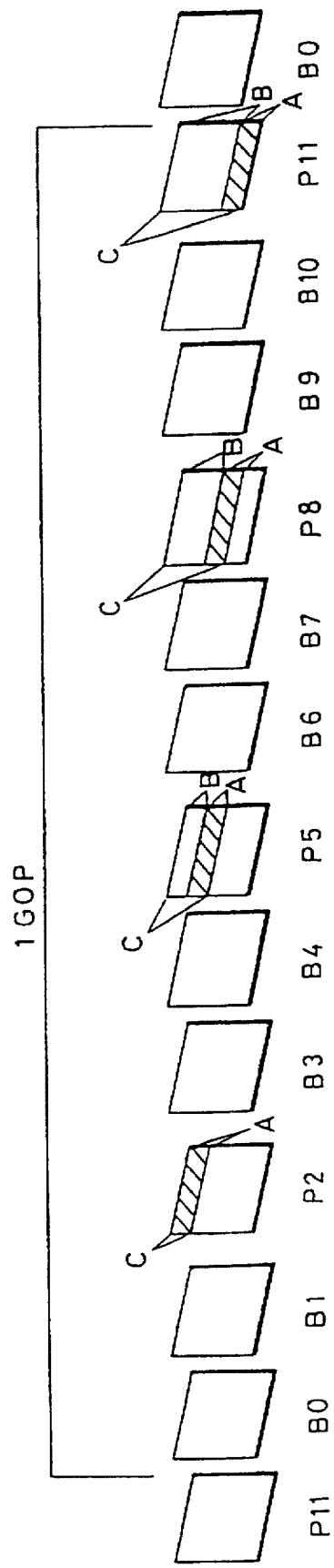
FIG. 4 is a diagram illustrative of an encoding procedure for intra slices according to the present invention.
Figure 5:
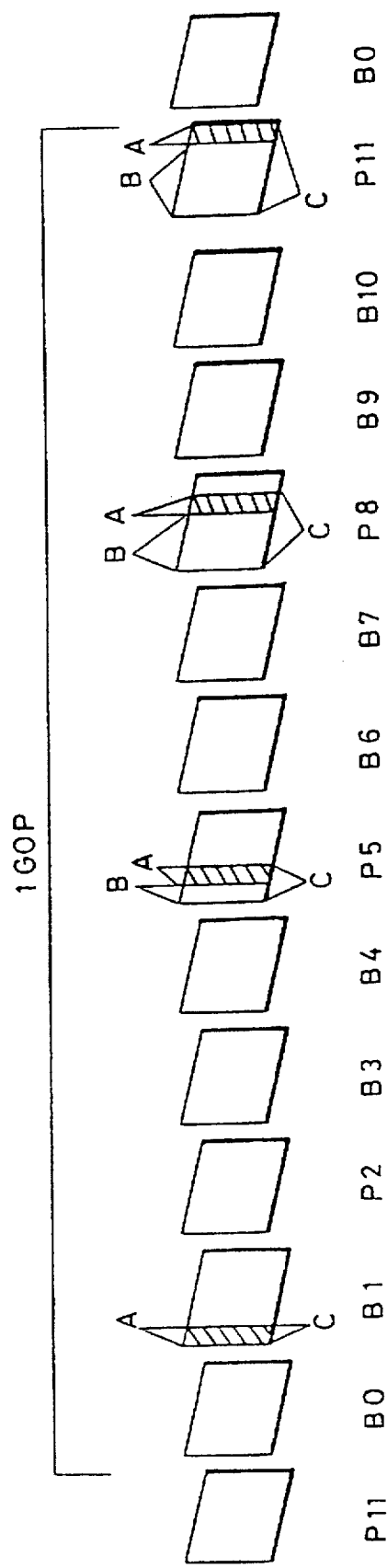
FIG. 5 is a diagram illustrative of an encoding procedure for intra columns according to the present invention.

First, a scattering of intra macroblocks is described. FIGS. 4 and 5 show a GOP arrangement. According to the present invention, a GOP is composed only of P pictures and B pictures, rather than I pictures. As shown in hatched shading, a region of each P picture is intra-frame coded so that the intra-frame coded regions of the respective P pictures are staggered.

In FIG. 4, the intra-frame coded regions of the respective P pictures are staggered vertically on the image area (hereinafter called "intra slice"). In FIG. 5, the intraframe coded regions of the respective P pictures are staggered horizontally on the image area (hereinafter called "intra column"). The intra-frame coded regions may be staggered downwardly or to the left.

As with the P pictures, I pictures may be established and regions on the image area may be maintained as data for high-speed reproduction. In particular, for high-speed reproduction, only the intra-frame code regions are reproduced.

The intra-frame coded regions are staggered to cover at least the entire image area in one GOP. In other words, the regions are limited such that a collection of the intra-frame coded regions (indicated by A) in FIGS. 4 and 5 covers at least the entire image area. Specifically, the intra-frame coded regions are arranged so as not to leave gaps on the image area or so as to overlap each other.

In FIGS. 4 and 5, the regions which are intra-frame coded are designated by "A". In a next P picture which is encoded predictively from that frame, a region which is present above an intra-frame coded region A in FIG. 4 or below an intra-frame coded region A in FIG. 5 is indicated by B. The region B is therefore a region which has been intra-frame coded in a prior P picture. The combination of the regions A and B is referred to as a region C.

The region C in any particular frame is either equal to or wider than the region B in a next P picture which is encoded predictively from that particular frame.

Slices are assigned such that slices are divided with one macroblock line so as to begin at the left end of an image area and end at the right end of the image area as shown in FIGS. 6A through 6E. According to the FIG. 6A embodiment, it is possible to divide slices such that intra-frame coding macroblocks scattered as described above are positioned at beginning ends of the slices.

Figure 6A:
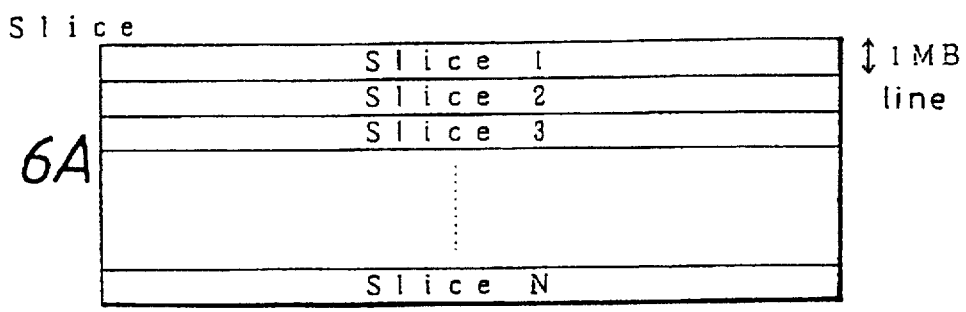
FIG. 6A is a diagram illustrative of a slice structure according to the present invention.
Figure 6B:
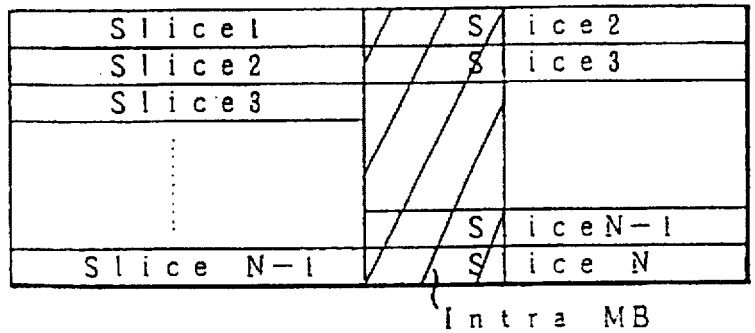
FIG. 6B is a diagram illustrative of a slice structure according to the present invention.
Figure 6C:
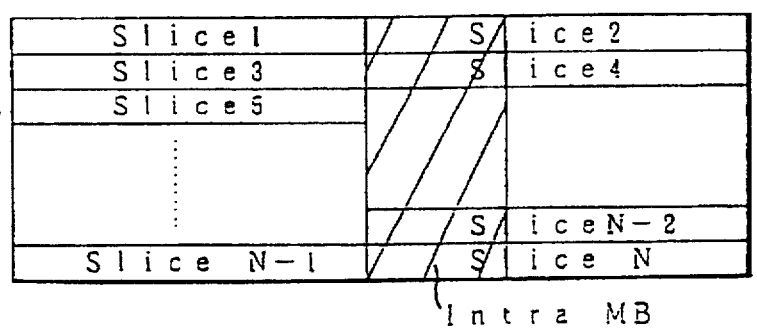
FIG. 6C, is a diagram illustrative of a slice structure according to the present invention.

FIGS. 6B and 6C show a structure of intra columns in which intra-frame coding macroblocks scattered as described above are arranged in columns. In FIG. 6B, one slice does not terminate at the right end of an image area. In FIG. 6C, one slice necessarily terminates at the right end of an image area.

Figure 6D:
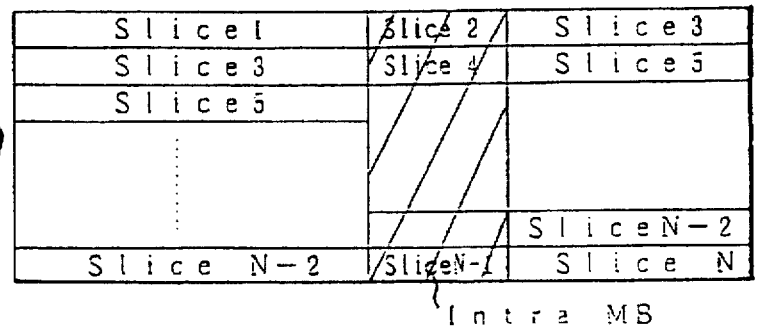
FIG. 6D is a diagram illustrative of a slice structure according to the present invention.
Figure 6E:
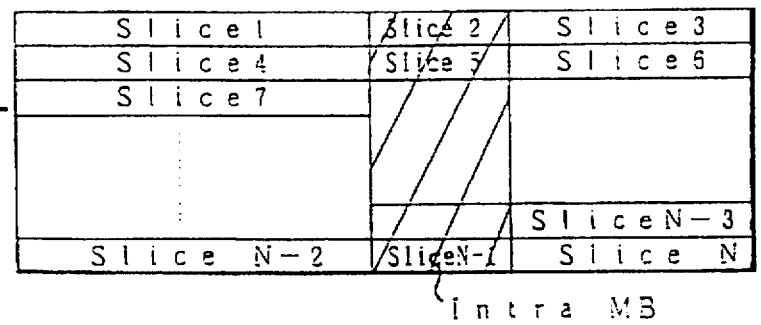
FIG. 6E is a diagram illustrative of a slice structure according to the present invention.

According to a modification, it is possible to divide slices such that all macroblocks in a slice are intra-frame coding macroblocks or of other two types. FIGS. 6D and 6E show such slice divisions. FIG. 6D shows a slice structure in which one slice does not terminate at the right end of an image area. FIG. 6E shows a slice structure in which one slice necessarily terminates at the right end of an image area.

According to the present invention, the motion compensation of a P picture is limited. The region B of any particular frame (FIGS. 4 and 5) is limited to motion compensation from the region C of a past frame which is referred to by the particular frame. If the region C of the particular frame is equal to the region B of a P picture which is encoded predictively from the particular frame, then the motion compensation in the region B is limited in some respects.

For example, a block on a lower boundary of the region B in the frame P8 shown in FIG. 4 is motion compensated only from the region C in the frame P5 and, hence, no upward motion is compensated for in that block. Similarly, since a block on a right boundary of the region B in the frame P8 shown in FIG. 5 is motion-compensated only from the region C in the frame P5, no leftward motion is compensated for in that block. Since the motion compensation in a block on a boundary of the region B is limited, the efficiency is somewhat lowered.

However, if the region C covers an area wider than the region B, however, then the motion compensation is less limited. If a overlapping region covers an area wider than the range of motion compensation, then the motion compensation is limited at all and efficiency is not affected.

The region C may cover the entire image area at least once per GOP. Inasmuch as the region C is composed of a region A which is intra-frame coded in a particular frame and a region B which is intra-frame coded in a P picture prior to the particular frame, the region C may be composed of only information which is intra-frame coded in the GOP.

With these limitations of regions and motion compensation, even when decoding is started from somewhere within a bit stream, mismatch-free (with agreement with the encoding side) decoding can be carried out after at least one GOP data have been decoded. In other words, random access is assured.

Referring to a specific example, an image has 720 pixels arranged horizontally and 480 lines arranged vertically, and a unit range to be encoded has a size of 106 pixels by 16 lines, which is called a macroblock. The macroblocks are transmitted successively to the right and downwardly on the image. A number of macroblocks arranged in the order in which they are transmitted are called a slice. For example, one row of macroblocks across the image area may serve as a slice. Specifically, 720 pixels/16 pixels=45 macroblocks, and 480 lines/16 lines=30 slices.

In order to cover the entire image area with intraframe coded regions A in FIG. 4, since there are four P pictures, every 7 slices and every 8 slices are alternately intra-frame coded. In order to have regions overlap each other, each of intra-frame coded regions A is composed of 10 slices, the region B of the frame P5 is composed of 7 slices, the region B of the frame P8 is composed of 13 slices, and the region B of the frame P11 is composed of 20 slices, with the result that the regions overlap each other by 3 slices and 2 slices.

In order to cover the entire image area with intraframe coded regions A in FIG. 5, since there are four P pictures, 11 macroblock widths are intraframe coded three times and 12 macroblock widths are intra-frame coded once. In order to have regions overlap each other, each of intra-frame coded regions A is composed of 12 macroblocks widths, and the region B of each of the frames P5, P8 is composed of 11 macroblock widths, with the result that the regions overlap each other by 1 macroblock width.

According to the above encoding process, intra-frame coded macroblocks are scattered on the image area, and a flag indicative of such a structure is provided. The syntax according to MPEG is hierarchical, and includes a lower-most layer of a sync code with a unit of slice. In this embodiment, a flag representing a structure of a slice is added to a header of the slice. The sync code is a type of synchronizing signal. It is a unique bit pattern in the bit stream which is inhibited from being generated outside of the bit stream. By detecting a start code, it is possible to reproduce data from anywhere within the bit stream (random access), or to recover from an error which occurs during transmission in the transmission path.

In this embodiment, a flag is indicative of whether there is an intra-frame coded macroblock to be decoded within any particular slice upon reproduction at a high speed in both forward and reverse directions, and is also indicative of the structure of such a macroblock if it exists. The flag is inserted into the bit stream by the FLC 54. The intra-frame coded macroblock referred to above is a macroblock which is fixedly intra-frame coded for reproduction at a high speed in both forward and reverse directions. The flag described below is not applied to macroblocks which are adaptively selected and intra-frame coded for ordinary encoding of P pictures.

With respect to intra slices shown in FIG. 4, in one particular slice, no intra-frame coded macroblocks are present, and another slice is entirely composed of intra-frame coded macroblocks. With respect to the intra-frame columns shown in FIG. 5, some macroblocks in a slice are intra-frame coded.

Figure 7A:
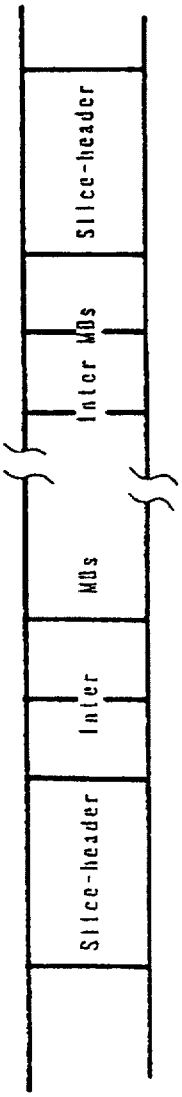
FIG. 7A is a diagram showing a slice with no intra MBs, illustrating the arrangement of a bit stream according to the present invention.
Figure 7B:
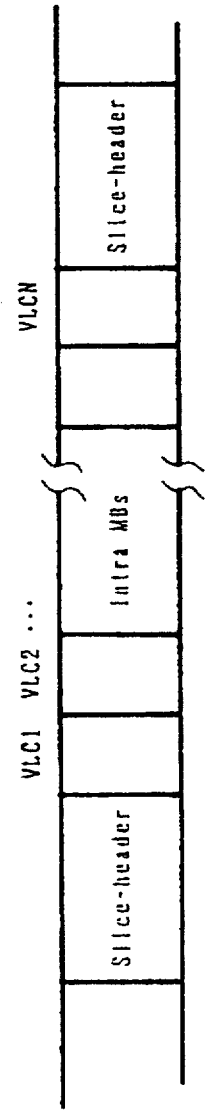
FIG. 7B is a diagram showing a slice with all intra MBs, illustrating the arrangement of a bit stream according to the present invention.
Figure 7C:
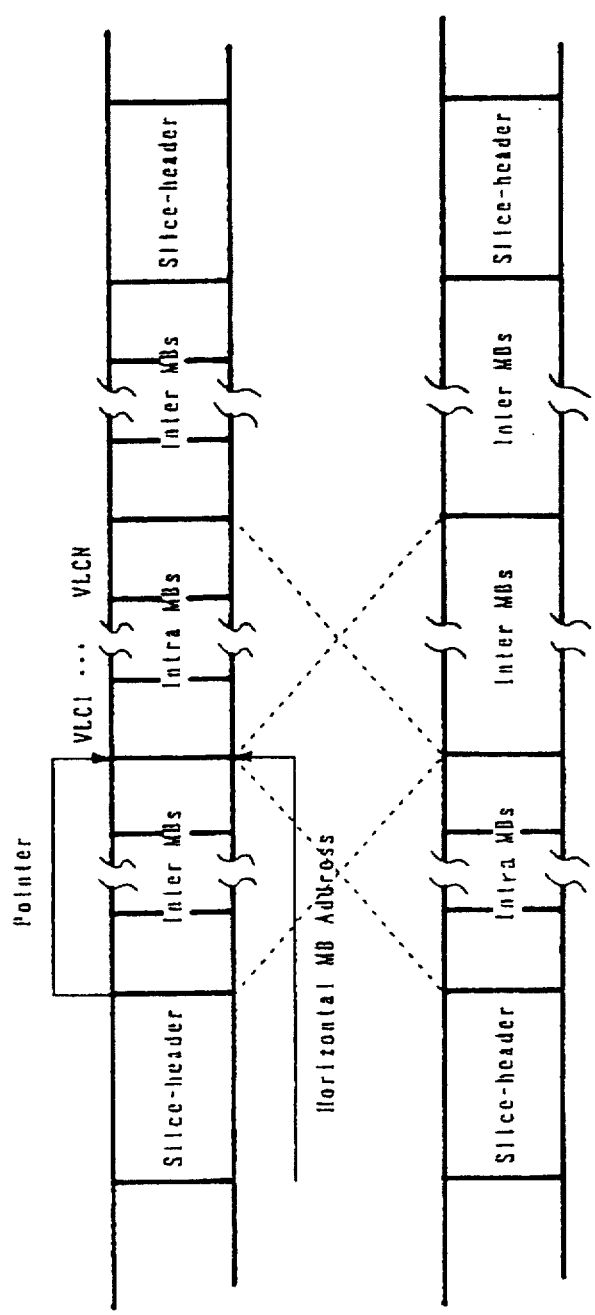
FIG. 7C is a diagram showing a slice with some intra MBs, illustrating the arrangement of a bit stream according to the present invention.

The bit streams of the above slices are illustrated in FIGS. 7A, 7B, and 7C. To distinguish the three types of slices shown in FIGS. 7A, 7B, and 7C, a structure flag is established as shown in Table I below.

TABLE 1

| Structure flag | Types of slices |
| --- | --- |
| 10 | Slice with all Intra MBs |
| 11 | Slice with some intra MBs |
| 0 | Others |

In the case where all macroblocks in a slice are intra-frame coded as shown in FIG. 7B, i.e., the structure flag="10", a flag indicative of the internal structure is established as shown in Table 2 below.

TABLE 2

| Flag | Number of bits |
| --- | --- |
| MB Number | 16 bits |
| Length | 24 bits times N |

MB Number indicates the number of intra MBs in a slice. The MB number flag may also be of variable length.
Length indicates the number of bits of N intra MBs indicated by the MB Number. (The length flag may be of variable length even though it is shown as a flag of a fixed length of 24 bits.)

In the case where some macroblocks in a slice are intra-frame coded as shown in FIG. 7C, i.e., the structure flag="11", a flag indicative of an internal structure is established as shown in Table 3 below.

TABLE 3

| Flag | Number of bits |
| --- | --- |
| Horizontal MB Address | 16 bits or VLC |
| Pointer | 24 bits |
| MB Number | 16 bits |
| Length | 24 bits times N |

Horizontal MB address: Address of intra MB from the left end of the image area. (The unit is the number of MBs. This flag may be fixed length, or of a variable length which is the same as MacroBlock Address Increment used by MPEG.)
Pointer: Pointer from a given position in a slice header to intra MB. (The unit is a bit. This flag may be of variable length.)
MB Number: The number of intra MBs in a slice. The MB number flag may also be variable length.
Length: the number of bits of N intra MBs indicated by the MB Number. The "length" flag may be of variable length.)

With the above flags, even if some macroblocks in a slice are intra-frame coded, the intra-frame coded macroblocks can be extracted using only the flag information in the slice header, without decoding the entire bit stream.

The above flags are introduced in a format shown in FIG. 9 after a quantizer scale of a syntax (described in ISO-IEC/ JTC1/SC29/WG11 N0328 Test Model 3, Draft Revision 1, page 61) which is reviewed in present MPEG2.

In the event that a slice contains two or more discrete intra-frame coded macroblocks which have been intentionally scattered as described above, the information of only one of the macroblocks is recorded in the header just described.

A second syntax (Syntax 2) is a modification of Syntax 1. A slice in which all macroblocks are intra-frame coded may be regarded as being contained in a slice in which some macroblocks are intra-frame coded. Therefore, the slices shown in FIGS. 7A and 7B may be described by the same flag. In this case, the structure flag is of 1 bit as shown in Table 4 below.

TABLE 4

| Structure Flag | Types of slices |
|---|---|
| 1 | Slice with some intra MBs |
| 0 | Others |

In the case where the structure flag="1", a flag indicative of an internal structure is established as shown in Table 5 below.

TABLE 5

| Flag | Number of bits |
|---|---|
| Horizontal MB Address | 16 bits or VLC |
| Pointer | 24 bits |
| MB Number | 16 bits |
| Length | 24 bits times N |

The above flags are introduced in a format shown in FIG. 9 after a quantizer scale of the syntax of MPEG.

(Syntax 3)

A third syntax (Syntax 3) is a modification of Syntax 2. For establishing slices such that intra-frame coded macroblocks are positioned at the starts of the slices, as shown in FIGS. 6B and 6C, the amount of flag data that are transmitted can be reduced by using Syntax 3.

Figure 11A:
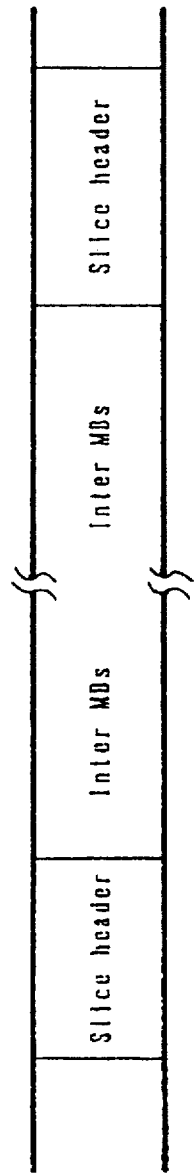
FIG. 11A is a diagram showing slice with no intra MBs showing the arrangement of a bit stream according to the present invention.
Figure 11B:
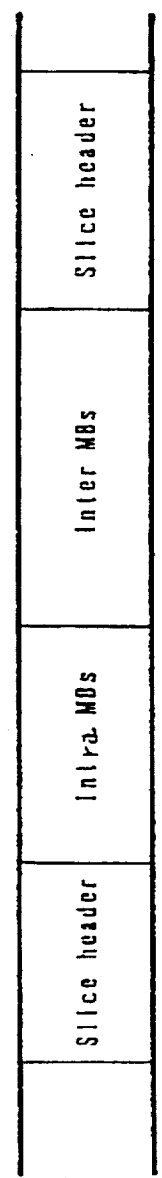
FIG. 11B is a diagram showing slice with some intra MBs (including all intra MBs) showing the arrangement of a bit stream according to the present invention.

In this case, bit streams of slices have two structures as shown in FIGS. 11A and 11B. Since intra-frame coded macroblocks are necessarily positioned at the starts of the slices, it is not necessary to transmit a pointer and a horizontal MB address.

An example of a flag structure in this case is shown in Table 6 below.

TABLE 6

| Structure flag | Types of slices |
|---|---|
| 1 | Slice with some intra MBs |
| 0 | Others |

In the case where the structure flag="1", a flag indicative of an internal structure is established as shown in Table 7 below.

TABLE 7

| Flag | Number of bits |
|---|---|
| MB Number | 16 bits |
| Length | 24 bits |

Figure 12:
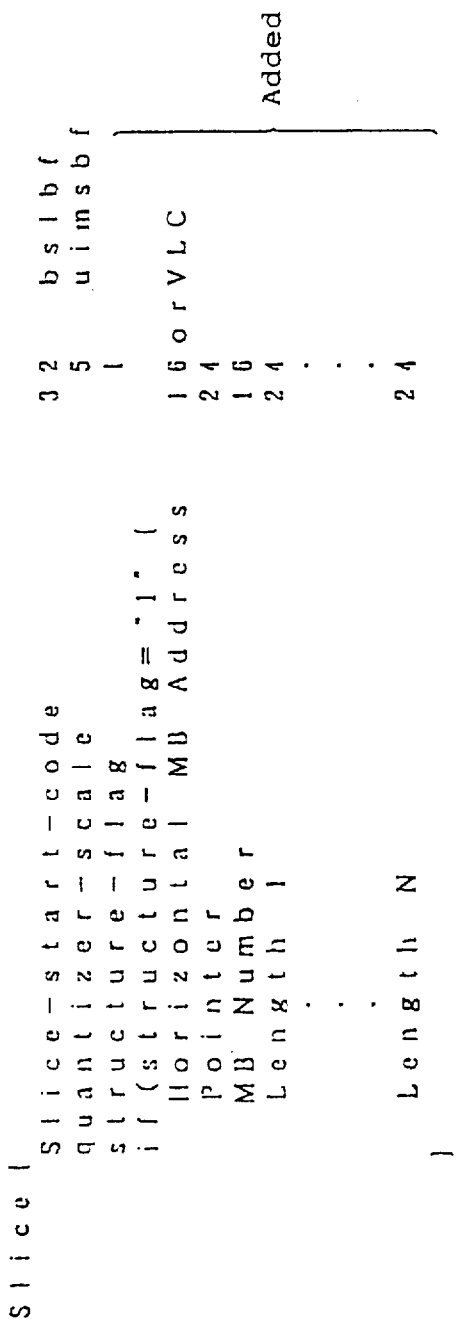
FIG. 12 is a diagram showing an introduction of syntax according to the present invention into MPEG.

The above flags are introduced in a format shown in FIG. 12 and are provided in the MPEG header after the quantizer scale.

If slices are divided into two types of slices, i.e., slices in which all macroblocks are intra-frame coded macroblocks, and other slices, as shown in FIGS. 6C and 6D, then only a structure flag need be transmitted. However, if all the data of the slices cannot be read, then the data may be decoded according to one of the following processes: (1) only those data which can be read are decoded; (2) the data of the final macroblock which has been read, (i.e., macroblocks whose data are interrupted) are discarded, and (3) the data of the final slice which has been read (i.e., the slice where the data are interrupted) are discarded. An example of the flag for this case is shown in Table 8 below. This flag is introduced in a format shown in FIG. 13 and is provided in the MPEG header after the quantizer scale.

TABLE 8

| Structure flag | Types of slices |
|---|---|
| 1 | Slice with all intra MBs |
| 0 | Others |

A fifth syntax (Syntax 5) is a modification of Syntax 4. If slices are divided into two types of slices, i.e., slices in which all macroblocks are intra-frame coded macroblocks, and other slices, then a structure flag shown in Table 8 is transmitted as with Syntax 4, and the number of bits of the intra-frame coded macroblocks is transmitted. With this flag, it is possible to determine whether all the data of the slices have been read by only decoding in the inverse VLC 22 without decoding all the data with the subsequent dequantizer 25 and the inverse DCT. An example of the flag for this case is shown in Table 9 below. This flag is introduced in a format shown in FIG. 14 and is provided in the MPEG header after the quantizer scale.

TABLE 9

| Flag | Number of bits |
|---|---|
| Total Length | VLC |

If all the data of the slices cannot be read, then the data may be decoded according to one of the following processes: (1) only those data which could be read are decoded; (2) the data of the final macroblock are discarded, and (3) the data of the slice of the final macroblock are discarded.

A sixth syntax (Syntax 6) is a modification of Syntax 1. A structure flag shown in Table 10 below may be established to distinguish between the three types of slices shown in FIGS. 7A, 7B, 7C.

TABLE 10

| Structure Flag | Types of slices |
|---|---|
| 01 | Slice without MBs for FF/FR |

TABLE 10-continued

| Structure Flag | Types of slices |
| --- | --- |
| 10 | Slice with all MBs for FF/FR |
| 11 | Slice with some (but not all) MBs for FF/FR |
| 00 | Reserved |

Furthermore, if all the macroblocks in the slices are intra-frame coded as shown in FIGS. 6D and 6E (i.e., the structure flag="10") then a flag indicative of an internal structure is established as shown in Table 11 below.

TABLE 11

| In case the structure flag = "10", Flag | Number of bits |
| --- | --- |
| MB Number | 16 bits |
| Length | 24 bits times N |

MB Number the number of intra MBs in a slice.
Length the total number of bits of N intra MBs indicated by the MB number.

If the structure flag="11", then a flag indicative of an internal structure is established as shown in Table 12 below.

TABLE 12

| In case the structure flag = "11", Flag | Number of bit |
| --- | --- |
| Horizontal MG Address | 8 bits |
| Pointer | 16 bits |
| MB Number | 6 bits |
| Length | 12 bits times N (MBs) |

Horizontal MB address Address of intra MB from the left end of the image area.
Pointer Pointer from a given position in a slice header to intra MB.
MB Number the number of intra MBs in a slice.
Length the number of bits of N intra MBs indicated by the MB Number.

The above flags are introduced as an extra portion of the MPEP header syntax, as shown in FIG. 15. A flag DSM__ FF/FR indicating that data for high-speed reproduction have been recorded is added to a sequence header as shown in FIG. 16.

Encoding system and Decoding system

An embodiment in which the above encoding and decoding apparatus as they are applied to a recording apparatus and a reproducing apparatus is now described with reference to the drawings. First, the arrangements of a moving image recording apparatus and a moving image reproducing apparatus according to the present invention is described.

Figure 17:
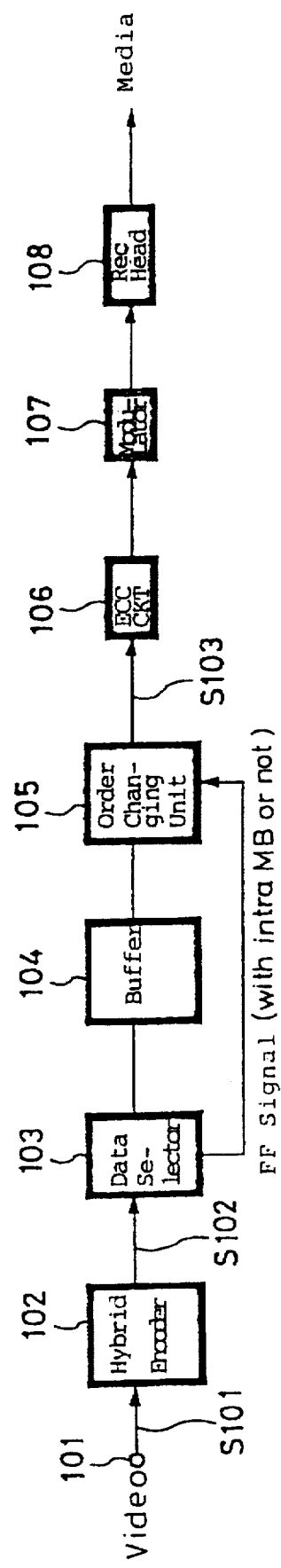
FIG. 17 is a block diagram of an encoding system according to an embodiment of the present invention.

The arrangement of the moving image recording apparatus is shown in FIG. 17. Input image data S101 are inputted through an input terminal 101 to a hybrid encoder 102 of the type described above, and encoded according to the above encoding process.

An output bit stream S102 from the hybrid encoder 102 is inputted to a data selector 103. The data selector 103 decodes a slice header in the bit stream S102, reads a signal (structure flag described above) indicative of whether an intra-frame coded macroblock is contained in the slice, and outputs the signal as an FF signal to an order changing unit 105.

The data of the intra-frame coded macroblock supplied through a buffer 104 to the order changing unit 105 are changed in order as described later based on the FF signal by the order changing unit 105, and then outputted as data S103 from the order changing unit 105.

To the data S103, there is added an error-correcting code by an ECC circuit 106. The data S103 are supplied through a modulator 107 to a recording head 108, which records the data on a recording medium such as a magnetic tape, an optical disc, or the like.

Figure 18:
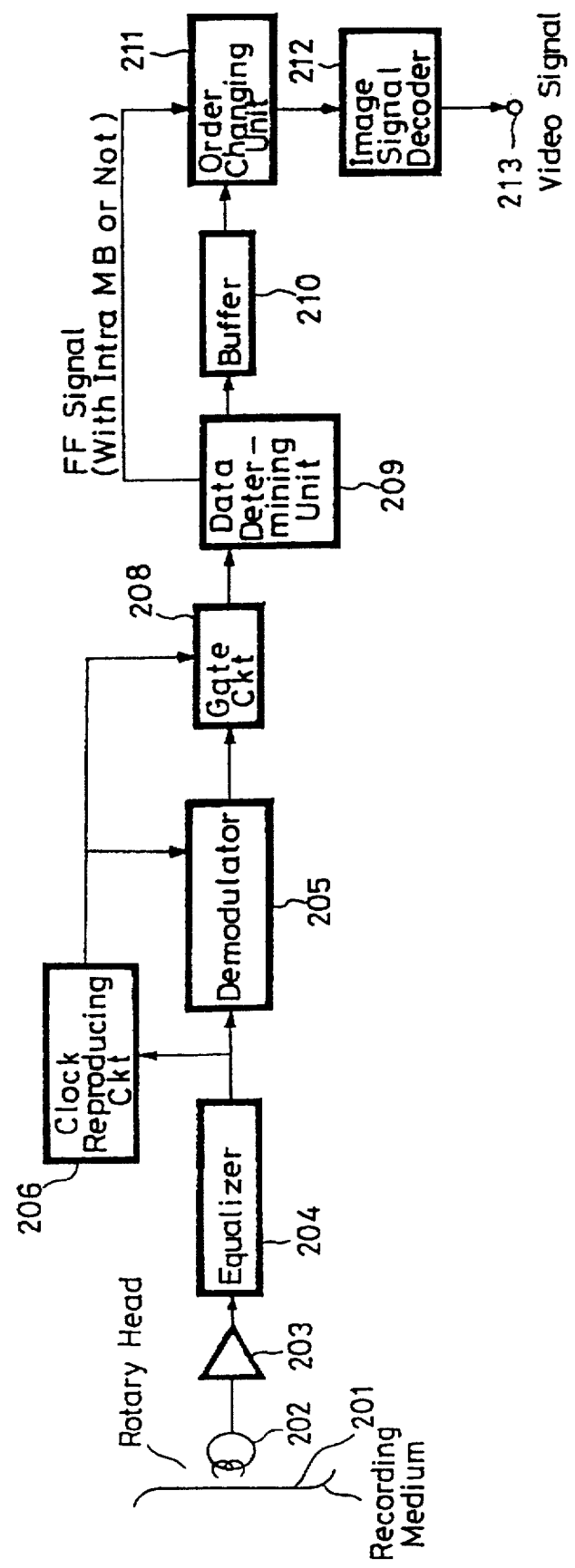
FIG. 18 is a block diagram of a decoding system according to an embodiment of the present invention.

The arrangements of the moving image reproducing apparatus are shown in FIGS. 18 and 19. FIG. 18 shows the arrangement which employs a tape medium, and FIG. 19 shows the arrangement which employs a disc medium.

The arrangement shown in FIG. 18 is described first. In this embodiment, a signal reproduced from a magnetic tape 201 by a magnetic head 202 mounted on a rotary head drum is outputted through a preamplifier 203 and an equalizer 204 to a demodulator 205, which demodulates the inputted data. An output signal from the equalizer 204 is supplied to a clock reproducing circuit 206, which generates a clock (hereinafter referred to as a "reproduction clock") in synchronism with the reproduced signal. Demodulated data are inputted to a gate circuit 208.

For high-speed reproduction, the recording medium is transported at a speed higher than an ordinary speed. The gate circuit 208 gates only an interval for which the accurate reproduced signal is outputted when digital data recorded in tracks are read in a high-speed search mode, and outputs only reproducible sectors to a data determining unit 209.

The demodulator 205 and the gate circuit 208 are supplied with the reproduction clock from the clock reproducing circuit 206 for processing the signal in synchronism with the supplied reproduction clock.

The data determining unit 209 decodes a slice header in the bit stream, decodes a flag (structure flag as described later on) indicative of whether an intra-frame coded macroblock is contained in the slice, and outputs the flag as an FF signal to an order changing unit 211. For high-speed reproduction, the data determining unit 209 outputs only slices, which contain intra-frame coded macroblocks to a buffer 210, and discards slices which contain no intra-frame coded macroblocks, according to the structure flag. Details of operation of the data determining unit 209 will be described later on.

For normal reproduction, the data determining unit 209 outputs all the data to the buffer 210. The data of the slice which contains an intra-frame coded macroblock are changed in order as described later by the order changing unit 211, and then outputted as an output image signal to an image signal decoder 212.

The image signal decoder 212 decodes the supplied image signal, and outputs an image signal. The image signal is outputted through an image output terminal 210.

Figure 20:
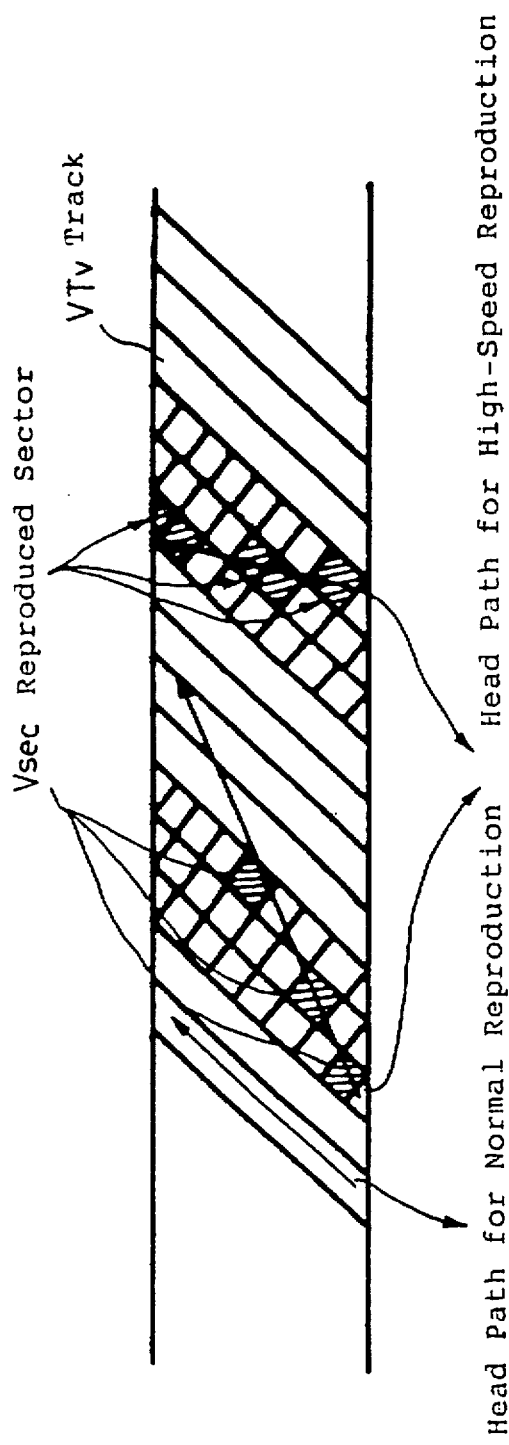
FIG. 20 is a view illustrative of head paths upon high-speed reproduction.

In the case where the encoded bit stream is recorded on the tape medium, the head scans the tape medium along tracks VTr as indicated by the solid-line arrow SVh in FIG. 20 for normal reproduction. For high-speed forward and reverse reproduction, the head reproduces the recorded data while obliquely crossing the tracks VTr as indicated by the solid-line arrows FVh. Therefore, the data of only some of the sectors Vsec are reproduced, but only the data of some sectors Vsec shown hatched are reproduced. Consequently, the reproduced data comprise a bit stream composed of unsuccessive bunches of successive sectors.

The arrangement shown in FIG. 19 is now described. To reproduce a signal recorded on a disc medium 301, the signal is read by a pickup 302, output data from the pickup 302 are demodulated by a demodulator 303. When a sector detector 304 reads one sector of data from the demodulator 303, errors contained in the data are corrected by an error correcting unit 305. An error-corrected signal from the error-correcting unit 305 is inputted to a ring buffer 306. A drive controller 307 reads a sector address supplied from the sector detector 304, and, if a track jump is necessary, sends a control signal to a tracking servo circuit 308 to move the pickup to an indicated track. A buffer controller 309 controls a write pointer and a read pointer of the ring buffer 306 based on the sector address supplied from the sector detector 304. Output data from the ring buffer 306 are inputted to a data determining unit 209. The data determining unit 209 and following units are identical to those used for the tape medium.

Figure 21:
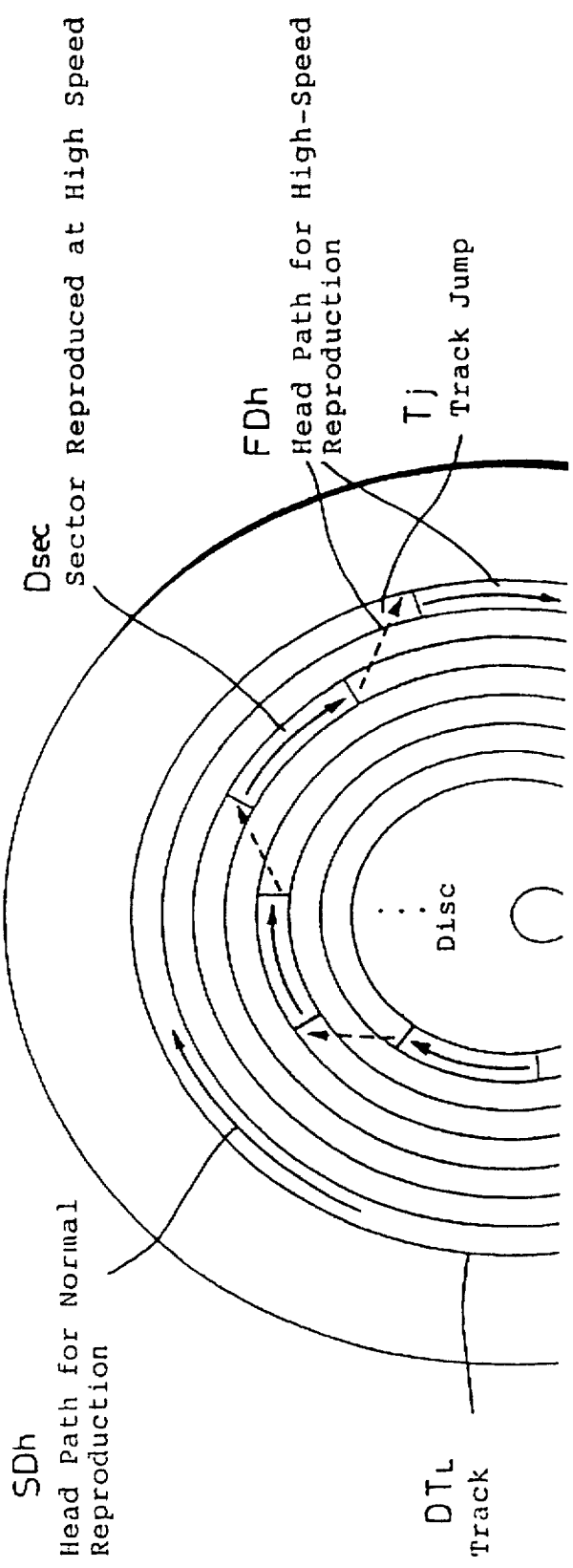
FIG. 21 is a view illustrative of head paths upon high-speed reproduction.
Figures 22A, 22B:
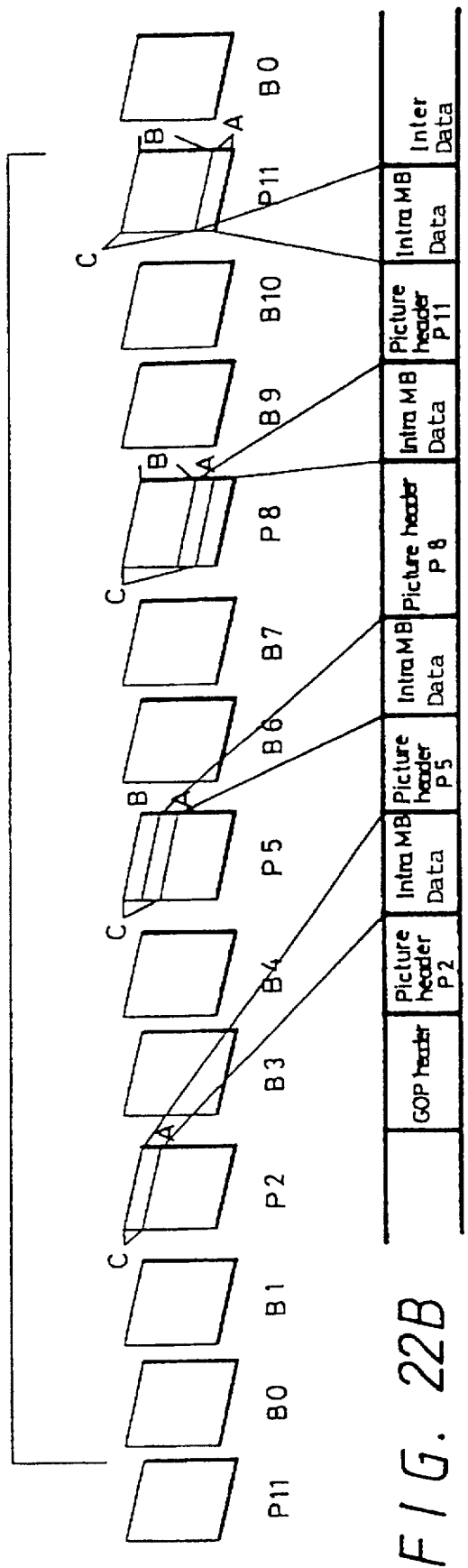
FIG. 22A is a diagram illustrative of the arrangement of a bit stream according to the present invention.
FIG. 22B is a diagram illustrative of the arrangement of a bit stream according to the present invention.
Figure 23:
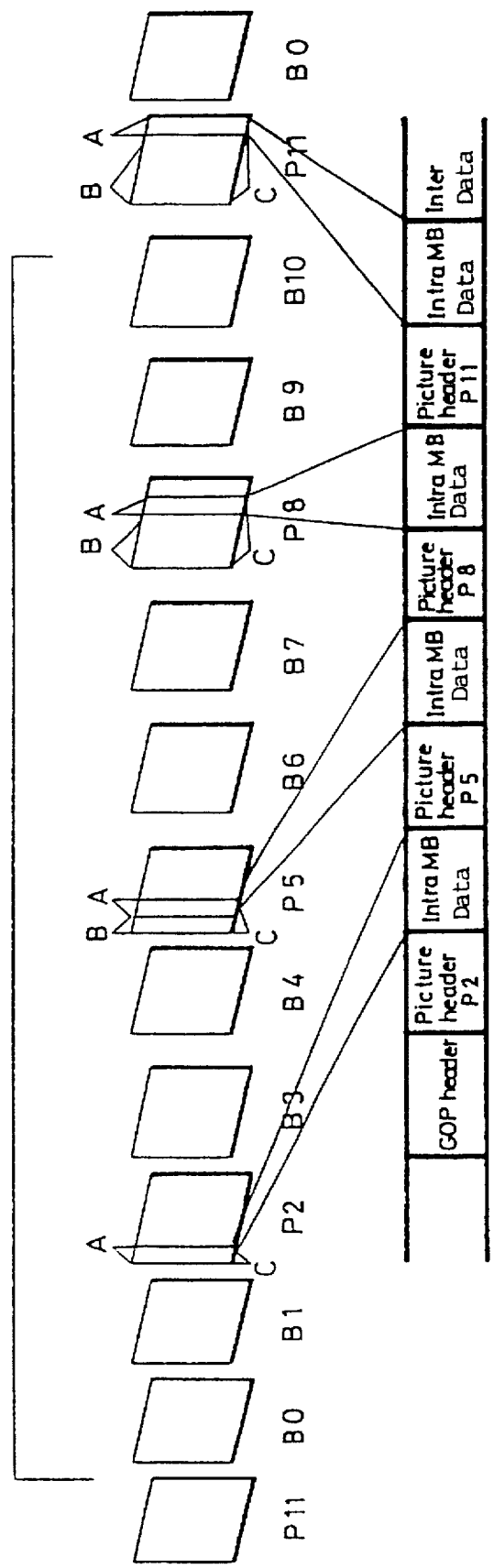
FIG. 23 is a diagram illustrative of the arrangement of a bit stream according to the present invention.

In the case where the encoded bit stream is recorded on the disc medium, the head reproduces consecutive sectors on a track DTr on the disc as indicated by the solid-line arrow SDh in FIG. 21, for normal reproduction. For high-speed forward and reverse reproduction, the head reproduces consecutive sectors Dsec on a track DTr on the disk, then makes a track jump to a next track, and reproduces consecutive sectors Dsec on the track as indicated by the solid-line arrows FDh and the broken-line arrows Tj.

On the tape or disc medium, therefore, not all the data are reproduced, but only the data of some sectors Dsec are reproduced. Consequently, the reproduced data comprise a bit stream composed of unsuccessive bunches of successive sectors. According to the present invention, the data determining unit 209 modifies the bit stream composed of unsuccessive bunches of successive sectors such that the ordinary MPEG decoder can reproduce the bit stream to produce an image upon high-speed forward and reverse reproduction. For this modification, the flags described above are employed.

Changing the order in which the bit stream is transmitted

Two embodiments of a process to transmit a bit stream are now described.

Figure 7D:
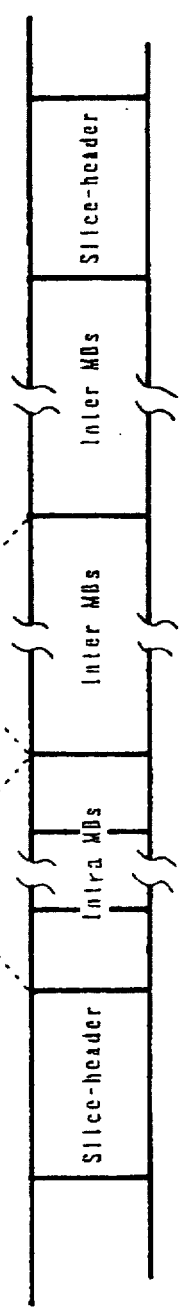
FIG. 7D is a diagram showing a bit stream with a modified sequence, illustrating the arrangement of a bit stream according to the present invention.
Figure 10:
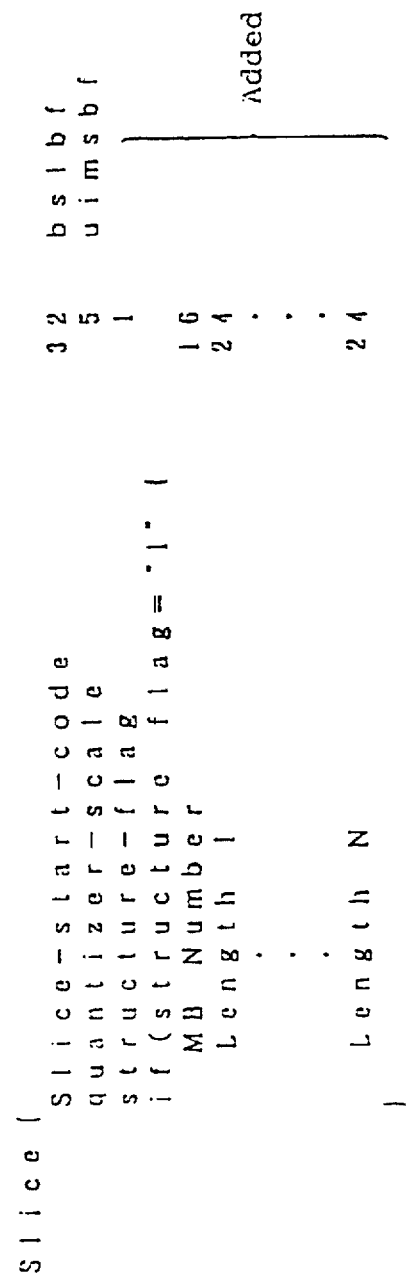
FIG. 10 is a diagram showing an introduction of syntax according to the present invention into MPEG.

A first process changes the structural order of a bit stream on a recording/transmitting side. If intra column are employed (the structure flag encoded by the FLC 54 shown in FIG. 1 is "1" or "11"), these flags are employed to change the structural order of the bit stream from FIG. 7C to FIG. 7D in the order changing unit 105 shown in FIG. 17. Specifically, the bit stream of an intra-frame coded macroblock is moved to be immediately after the slice header, and the bit stream is then recorded on a recording medium or transmitted. Thus, by detecting the slice header which is a sync code, the data of the intra-frame coded macroblock can be immediately obtained for smooth high-speed reproduction.

On the reproducing/receiving side, the bit stream may need to be reconstructed. For high-speed reproduction, the order changing unit 211 outputs a bit stream which has been recorded or transmitted without change. However, or normal reproduction, if intra column slices are employed, i.e., if the structure flag in the slice header is "1" or "11", then the flag indicative of the structure in the slice header is used to change the order of the bit stream from the order shown in FIG. 7D to the original encoded order shown in FIG. 7C in the order changing unit 211 shown in FIGS. 18 and 19.

The second process to change the order of the bit stream is now described. If intra slices/columns are employed (the structure flag is "1" or "10" or "11"), these flags are employed to change the structural order of the bit stream in the order changing unit 105 shown in FIG. 17. Specifically, the bit stream of all intra slices/columns contained in a GOP is moved to immediately follow a GOP header having a sync code, and the resulting bit stream is recorded on a recording medium or transmitted.

By then detecting the GOP header which is a bunch of motion compensation, the data of the intra-frame coded intra slices can be obtained for smooth high-speed reproduction.

To reconstruct such a modified bit stream on the reproducing/receiving side, for high-speed reproduction, the order changing unit 211 outputs a bit stream as it has been recorded or transmitted. For normal reproduction, if only intra slices are employed, then the above flag in the slice header is used to change the order of the bit stream to the original encoded order in the order changing unit 211 shown in FIGS. 18 and 19.

For normal reproduction, the data determining unit 209 outputs the reproduced bit stream as is. For decoding the above bit stream, the inverse VLC 22 of the decoder 212 does not decode the structure flag, as the structure flag is redundant.

For high-speed reproduction, the data determining unit 209 extracts data of intra-frame coded macroblocks from a reproduced bit stream, and interconnects the data to generate a bit stream which can be reproduced easily by the MPEG decoder.

First, a slice start code is detected from a bit stream composed of unsuccessive sectors. Since the slice start code is a sync code and is byte-aligned, the slice start code can be detected without entirely decoding the bit stream. That is, the data from the starting end of the sector to a position before the slice start code are not utilized.

The slice start code contains the vertical position of the slice on the image area, so that the vertical position of the slice can be identified with the slice start code. When the slice start code is detected, the given position of the slice header is decoded to detect the above flag. At this time, the data determining unit 209 detects the structure flag, and effects the following processing according to the detected structure flag:

(1) If the detected structure flag is 0, this indicates a slice with no intra macroblock. Since the slice contains no intra macroblock, the bit stream following the slice header is unnecessary until the slice start code is detected or up to the end of a plurality of successive sectors which have been reproduced. Therefore, these data are not employed.

(2) If the detected structure flag is 10, this indicates a slice with all intra macroblocks. Since the bit stream following the slice header is the data of the intra macroblocks, these data are used for high-speed forward and reverse reproduction. Therefore, for the bit stream following the slice header, there is employed a shorter one of a bit stream until the slice start code is detected or a bit stream up to the end of a plurality of successive sectors which have been reproduced.

(3) If the detected structure flag is 11, this indicates a slice with some intra macroblocks. Since the bit stream following the slice header contains some of the data of the intra macroblocks, only a corresponding portion of the bit stream is employed for high-speed forward and reverse reproduction. Therefore, a shorter one of a bit stream which extends from the bit stream following the slice header for a length indicated by Length, or a bit stream up to the end of a plurality of successive sectors which have been reproduced is employed.

Figure 24:
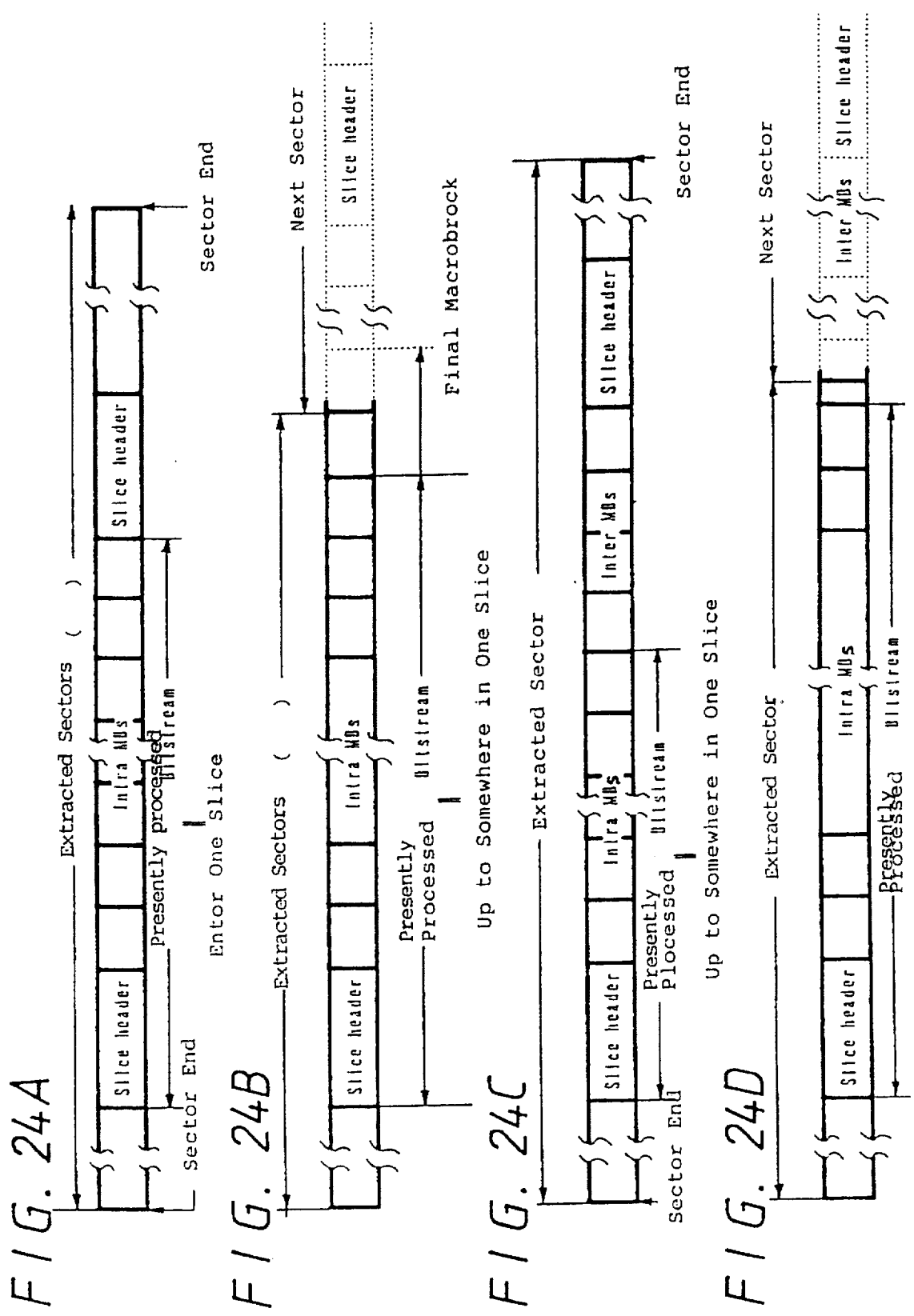
FIG. 24A is a diagram showing the arrangement of a bit stream in a case (A) according to the present invention.
FIG. 24B is a diagram showing the arrangement of a bit stream in a case (B) according to the present invention.
FIG. 24C is a diagram showing the arrangement of a bit stream in a case (C) according to the present invention.
FIG. 24D is a diagram showing the arrangement of a bit stream in a case (D) according to the present invention.

The bit stream thus extracted for high-speed forward and reverse reproduction is as shown in FIG. 24. If the structure flag is either (2) "10": Slice with all intra macroblocks, or (3) "11": Slice with some intra macroblocks then the data determining unit 209 effects the following processing:

(2) Slice with all intra macroblocks:

Case (A): If an extracted bit stream is a bit stream from a slice header to a next slice header, then the bit stream is connected to another bit stream as it is complete.

Case (B): If an extracted bit stream is a bit stream from a slice header to the end of a plurality of successive sectors, then the bit stream is interrupted at the sector end, and hence a macroblock at the last end of the sector is interrupted. Since the final macroblock cannot be decoded, the bit stream except the final macroblock is connected to another bit stream. The final macroblock can be removed because it is already known from the information of the flag in the slice header that the amount of code of all the intra macroblocks from the start of the slice.

(3) Slice with some intra macroblocks:

Case (C): If an extracted bit stream is a bit stream from a slice header, which has a length indicated by Length, then the bit stream is connected to another bit stream as it is complete.

Case (D): If an extracted bit stream is a bit stream from a slice header to the end of a plurality of successive sectors, then the bit stream is interrupted at the sector end, and hence a macroblock at the last end of the sector is interrupted. Since the final macroblock cannot be decoded, the bit stream except the final macroblock is connected to another bit stream. The final macroblock can be removed because it is already known from the information of the flag in the slice header that the amount of code of all the intra macroblocks from the start of the slice.

Figure 25:
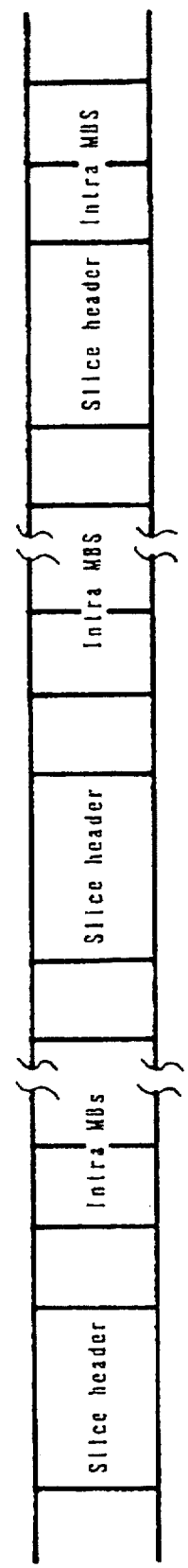
FIG. 25 is a diagram illustrative of the arrangement of a bit stream according to the present invention.
Figure 26:
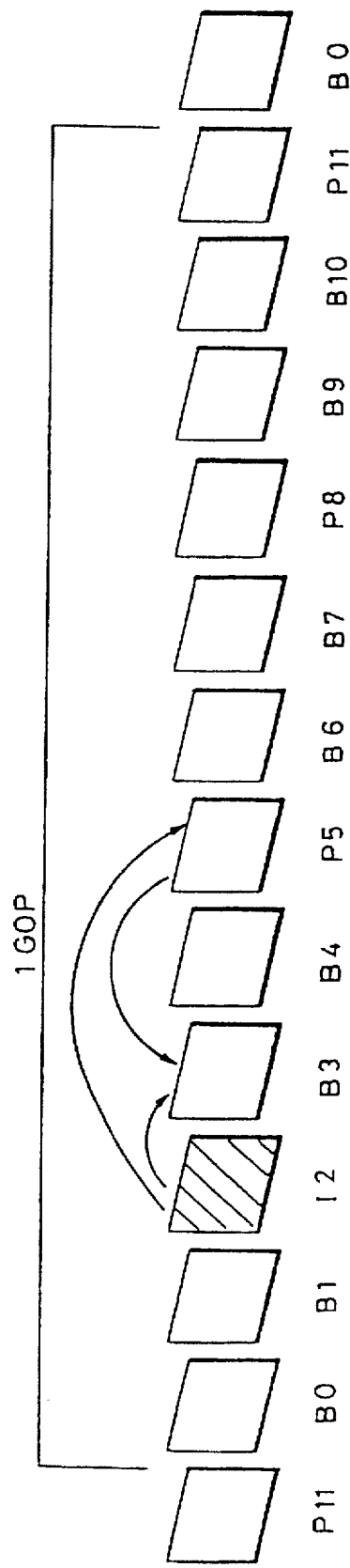
FIG. 26 is a diagram illustrative of a conventional encoding procedure.

The generated bit stream thus connected for high speed forward and reverse reproduction is shown in FIG. 25. As shown in FIG. 25, the bit stream is composed of data of intra macroblocks.

If a slice of the generated bit stream for high speed reproduction is a slice with all intra macroblocks, then because the horizontal positions of the macroblocks are written in a macroblock increment, it can be decoded by the normal MPEG decoding process.

If a slice of the generated bit stream for high speed reproduction is a slice with only some intra macroblocks, then the horizontal positions of the macroblocks are determined by horizontal MB addresses. Though this process is different from the normal MPEG decoding process, the addresses represent information which is the same as addresses obtained after MPEG decoding. Therefore, the slice can be decoded simply by modifying the process of decoding the bit stream in the inverse VLC.

Display of an image reproduced at a high speed

The image data thus decoded for high-speed reproduction are data of intra macroblocks. As the image data are P picture data, pictures are decoded as P pictures at all times for high-speed reproduction. At this time, a frame which is presently displayed is used as a frame to be referred to, and the image data decoded for high-speed reproduction are updated in a given position on the reference frame by an MB address.

Display process 1:

The image data decoded for high-speed reproduction are updated to the right or downwardly on the image area according to the MB addresses. In this display process, image data of intra macroblocks are decoded in a memory of the field memory group 28 which is different from a memory that stores a picture to be referred to, and macroblocks between those macroblocks are regarded as skip macroblocks of MPEG. One frame is decoded by copying image data of the frame to be referred to. If the decoding of one frame is completed in time for display, then the image decoded in the different memory is outputted as a display image. If the decoding of one frame is not completed, the image data of the frame to be referred to are outputted as a display image. In this embodiment, the decoding process consumes extra time as required by the copying process. The memory controller 23 may, however, control the field memory group 28 as usual.

Display process 2:

In this embodiment, data decoded from image data of intra macroblocks are written over the stored data in the memory of the field memory group 28 which stores a picture to be referred to.

According to this decoding process, since a picture is present in a particular memory at all times, even if the decoding (writing over) of all image data of intra macroblocks for high-speed reproduction of one frame is not completed, an image which is smooth and natural can be displayed by displaying the contents of the memory. The updating of the image data decoded for high-speed reproduction and the timing of the display may be independent of each other. The image data of the remaining intra macroblocks are decoded (written over) irrespective of the timing of the display, and displayed at the next timing of the display.

In this embodiment, sufficient time is available for the decoding for writing the image data over the stored data, but the control of the memory controller 23 is relatively complex.

According to the present invention, as described above, there are thus provided a moving image encoding apparatus, a moving image recording apparatus, a moving image recording apparatus, a moving image recording/transmitting format (bit stream syntax), a moving image reproducing apparatus, and a moving image decoding apparatus which are capable of reproducing moving image data at a high speed in forward and reverse directions when high-speed reproduction is selected.

We claim:

1. An image signal encoding method, comprising steps of:

coding input image signals to produce coded picture signals, the coded picture signals including a group-of-pictures, wherein the group-of-pictures includes a plurality of P-pictures but no I-pictures;

a first designating step for designating for at least some of the P-pictures of the group-of-pictures, first slices consisting entirely of intra-coded macroblocks;

providing, in the coded picture signals, an indication of the first slices a second designating step, for designating for at least some of the P-pictures of the group-of-pictures, second slices consisting only partly of intra-coded macroblocks: and providing, in the coded picture signals, an indication of the intra-coded macroblocks of the second slices.

2. The method of claim 1 wherein, for the group-of-pictures, the first designated slices are arranged to collectively cover at least an entire image area.

3. The method of claim 1 wherein, for the group-of-pictures, the first designated slices are arranged to collectively cover at least regions of an image to be reproduced in a special playback mode.

4. The method of claim 1 wherein, for the group-of-pictures, the first designated slices are designated to be at predetermined locations in the P-pictures without regard for an amount of information in each designated slice.

5. The method of claim 1 wherein, for the group-of-pictures, a portion of an image to be reproduced to which designated slices of a first picture correspond does not overlap portions of the image to which designated slices of all other pictures correspond.

6. The method of claim 1, further comprising a step of:
moving the first designated slices in the coded picture signals to be immediately following the indication of the designated slices.

7. The method of claim 1, further comprising:
moving the first designated slices in the coded picture signals to be immediately following a group-of-pictures header portion of the coded picture signal.

8. An image signal encoding apparatus, comprising:
means for coding an input image signal to produce coded picture signals such that coded picture signals includes a group-of-pictures, wherein the group-of-pictures includes a plurality of P-pictures but no I-pictures;

first means for designating, for at least some of the P-pictures of the group-of-pictures, first slices consisting entirely of intra-coded macroblocks;

means for providing in the coded picture signals, an indication of the first slices designated;

second means for designating, for at least some of the P-pictures of the group-of-pictures, second slices consisting only partly of intra-coded macroblocks; and means for providing, in the coded picture signals, an indication of the intra-coded macroblocks of the second slices.

9. The apparatus claim 8, wherein the first means for designating designates slices such that, for the group-of-pictures, the first designated slices are arranged to collectively cover at least an entire image area.

10. The apparatus of claim 8, wherein the first means for designating designates first slices such that, for the group-of-pictures, the first designated slices are arranged to collectively cover at least regions of an image to be reproduced in a special playback mode.

11. The apparatus of claim 8, wherein the first means for designating designates first slices such that, for the group-of-pictures, the first designated slices are located at predetermined locations in the predictive-coded pictures without regard for an amount of information in each designated slice.

12. The apparatus of claim 8, wherein the first means for designating designates first slices such that, for the group-of-pictures, a portion of an image to be reproduced to which first designated slices of a first picture does not overlap portions of the image to which first designated slices of all other pictures correspond.

13. The apparatus of claim 8, and further comprising:
means for moving the first designated slices in the coded picture signals to be immediately following the indication of the first designated slices.

14. The apparatus of claim 8, and further comprising:
means for moving the first designated slices in the coded picture signals to be immediately following a group-of-pictures header portion of the coded picture signals.

15. An image signal decoding method for decoding coded picture signals, the coded picture signals including a group-of-pictures, wherein the group-of-pictures includes a plurality of P-pictures but no B-pictures, the method comprising steps of:

separating, from the coded picture signals, a first indication of first slices of at least some of the P-pictures of the group-of-pictures designated as consisting entirely of intra-coded macroblocks;

separating, from the coded picture signals, a second indication of second slices of at least some of the P-pictures of the group-of-pictures designated as consisting only partly of intra-coded macroblocks;

separating, from the coded picture signals, a third indication, of the intra-coded macroblocks of the second slices; and decoding the indicated designated first slices and the macroblocks indicated by the third indication to generate unencoded image signals.

16. The method of claim 15 wherein, in the coded picture signals, the first designated slices of the group-of-pictures are arranged to collectively cover at least an entire image area.

17. The method of claim 15 wherein, in the coded picture signals, the first designated slices for the group-of-pictures are arranged to collectively cover at least regions of an image to be reproduced in a special playback mode.

18. The method of claim 15 wherein, in the coded picture signal, the first designated slices for the group-of-pictures are at predetermined locations in the predictive-coded pictures without regard for an amount of information in each first designated slice.

19. The method of claim 15 wherein, in the coded picture signal, the first designated slices for the group-of-pictures are arranged such that a portion of an image to be reproduced to which first designated slices of a first picture correspond does not overlap portions of the image to which designated first slices of all other pictures correspond.

20. The method of claim 15 wherein the first designated slices are arranged in the coded picture signals to be immediately following the indication of the first designated slices.

21. The method of claim 15 wherein the first designated slices are arranged in the coded picture signals to be immediately following a group-of-pictures header portion of the coded picture signals.

22. An image signal decoding apparatus for decoding coded picture signals, the coded picture signals including a group-of-pictures, wherein the group-of-pictures includes a plurality of P-pictures but no B-pictures, the method comprising steps of:

means for separating, from the coded picture signals, a first indication of first slices of at least some of the P-pictures of the group-of-pictures designated as consisting entirely of intra-coded macroblocks; and means for separating, from the coded picture signals, a second indication of second slices of at least some of the P-pictures of the group-of-pictures designated as consisting only partly of intra-coded macroblocks:

means for separating from the coded picture signals, a third indication of the intra-coded macroblocks of the second slices: and means for decoding the intracoded macroblocks of the indicated first designated slices and the indicated intra-coded macroblocks of the second slices to generate unencoded image signals.

23. The apparatus of claim 22 wherein, in the coded picture signals, the first designated slices of the group-of-pictures are arranged to collectively cover at least an entire image area.

24. The apparatus of claim 22 wherein, in the coded picture signals, the first designated slices for the group-of-pictures are arranged to collectively cover at least regions of an image to be reproduced in a special playback mode.

25. The apparatus of claim 22 wherein, in the coded picture signal, the first designated slices for the group-of-pictures are at predetermined locations in the predictive-coded pictures without regard for an amount of information in each first designated slice.

26. The apparatus of claim 22 wherein, in the coded picture signal, the first designated slices for the group-ofpictures are arranged such that a portion of an image to be reproduced to which first designated slices of a first picture correspond does not overlap portions of the image to which first designated slices of all other pictures correspond.

27. The apparatus of claim 22 wherein the first designated slices are arranged in the coded picture signals to be immediately following the indication of the first designated slices.

28. The apparatus of claim 22 wherein the first designated slices are arranged in the coded picture signals to be immediately following a group-of-pictures header portion of the coded picture signals.

29. A method for compressing image signals, the image signals including a current picture which is divided into blocks, to provide coded picture signals, the method comprising:

determining, from prediction blocks of a prediction picture and the blocks of the current picture, a motion vector for the blocks of the current picture;

determining differences between the prediction blocks of the prediction picture and the blocks of the current picture to provide prediction error blocks;

orthogonally transforming the prediction error blocks to provide transform coefficients;

quantizing the transform coefficients to provide quantized transform coefficients;

locally decoding the quantized transform coefficients to provide an additional prediction picture;

responsive to the motion vectors determined in the motion detecting step, selectively
    in a first mode, applying motion compensation to blocks of the prediction picture with respect to a past or future reproduced picture to generate a predictive coded picture;
    in a second mode, applying motion compensation, by a motion compensating means, to the block of the prediction picture with respect to both a past reproduced picture and to a future reproduced picture to generate a bidirectionally predictive coded picture providing a first designation signal to the motion compensating means indicating that, for at least some of the predictive-coded pictures, first designated slices are not to have motion compensation applied such that the first designated slices consist entirely of intracoded macroblocks;

providing a second designation signal to the motion compensating means indicating that, for at least some of the predictive-coded pictures, second slices have only some intracoded macroblocks, and the some intracoded macroblocks are not to have motion compensation applied:

coding the quantized transform coefficients and the motion vectors.

30. The method of claim 29, and further comprising:
  responsive to the first designation signal, adding slice headers to the coded picture signals that indicate, for each slice, whether the slice is a first designated slice.

31. The method of claim 29 wherein, in the first designating step, slices are designated such that, for a group-of-pictures, the first designated slices are arranged to collectively cover at least an entire image area.

32. The method of claim 29 wherein, in the first designating step, first slices are designated such that, for a group-of-pictures, the first designated slices are arranged to collectively cover at least regions of an image to be reproduced in a special playback mode.

33. The method of claim 29 wherein, in the first designating step, the slices are designated such that, for a group-of-pictures, the first designated slices are located at predetermined locations in the predictive-coded pictures without regard for an amount of information in each first designated slice.

34. The method of claim 29 wherein, in the first designating step, first slices are designated such that, for a group-of-pictures, a portion of an image to be reproduced to which designated first slices of a first picture correspond does not overlap portions of the image to which first designated slices of all other pictures correspond.

35. The method of claim 29, and further comprising:
  moving the first designated slices in the coded picture signals to be immediately following the indication of the first designated slices.

36. The method of claim 29, and further comprising:
  moving the first designated slices in the coded picture signals to be immediately following a group-of-pictures header portion of the coded picture signals.

37. An apparatus for compressing image signals, the image signals including a current picture which is divided into blocks, to provide coded picture signals, the apparatus comprising:

motion detecting means for determining, from prediction blocks of a prediction picture and the blocks of the current picture, a motion vector for the blocks of the current picture;

difference determining means for determining differences between the prediction blocks of the prediction picture and the blocks of the current picture to provide prediction error blocks;

orthogonal transform means for orthogonally transforming the prediction error blocks to provide transform coefficients;

quantizing means for quantizing the transform coefficients to provide quantized transform coefficients;

local decoding means for locally decoding the quantized transform coefficients to provide an additional prediction picture;

motion compensating means, responsive to the motion vectors determined by the motion detecting means, selectively operable
    in a first mode for applying motion compensation to blocks of the prediction picture with respect to a past or future reproduced picture to generate a predictive coded picture;
    in a second mode for applying motion compensation to the block of the prediction picture with respect to both a past reproduced picture and to a future reproduced picture to generate a bidirectionally predictive coded picture first designating means for providing a first designation signal to the motion compensating means indicating that, for at least some of the predictive-coded pictures, first designated slices are not to have motion compensation applied such that the first designated slices consist entirely of intracoded macroblocks;

second designating means for providing a second designation signal to the motion compensating means indicating that, for at least some of the predictive-coded pictures, second designated slices are not to have motion compensation applied such that the second designated slices consist only partly of intracoded macroblocks; and coding means for coding the quantized transform coefficients and the motion vectors.

38. The apparatus of claim 37, and further comprising:
header adder means, responsive to the first designation signal, for adding slice headers to the coded picture signals that indicate, for each slice, whether the slice is a first designated slice.

39. The apparatus of claim 37, wherein the first designating means designates first slices such that, for a group-of-pictures, the designated slices are arranged to collectively cover at least an entire image area.

40. The apparatus of claim 37, wherein the first designating means designates first slices such that, for a group-of-pictures, the first designated slices are arranged to collectively cover at least regions of an image to be reproduced in a special playback mode.

41. The apparatus of claim 37, wherein the first designating means designates first slices such that, for a group-of-pictures, the first designated slices are located at predetermined locations in the predictive-coded pictures without regard for an amount of information in each first designated slice.

42. The apparatus of claim 37, wherein the first designating means designates first slices such that, for a group-of-pictures, a portion of an image to be reproduced to which first designated slices of a first picture correspond does not overlap portions of the image to which first designated slices of all other pictures correspond.

43. The apparatus of claim 37, and further comprising:
means for moving the first designated slices in the coded picture signals to be immediately following the indication of the first designated slices.

44. The apparatus of claim 37, and further comprising:
means for moving the first designated slices in the coded picture signals to be immediately following a group-of-pictures header portion of the coded picture signals.

45. A recording medium having coded picture signals thereon, the coded picture signals having been generated by a method comprising steps of:
coding an input image signal to produce the coded picture signals, the coded picture signals including a group-of-pictures, the group of pictures including a plurality of P-pictures but no I-pictures;

a first designating step, for at least some of the P-pictures of the group-of-pictures, for designating first slices consisting entirely of intra-coded macroblocks;

a second designating step, for at least some of the P-pictures of the group-of-pictures for designating second slices consisting only partly of intra-coded macroblocks;

a third designating step, for the designated second slices, for designating the intra-coded macroblocks; and providing, in the coded picture signals, an indication of the first and second slices designated and of the designated intra-coded macroblocks of the second designated slices.

\* \* \* \* \*